(12) United States Patent
Saito et al.

(10) Patent No.: US 9,148,696 B2
(45) Date of Patent: Sep. 29, 2015

(54) DATA TRANSMISSION SYSTEM, RECEIVING APPARATUS, AND RECEIVING METHOD AS WELL AS SENDING APPARATUS AND SENDING METHOD

(75) Inventors: Tomonobu Saito, Tokyo (JP); Tsuyoshi Oobayashi, Tokyo (JP); Khac Tri Vu, Namur (BE); Geert Uytterhoeven, Arschott (BE); Tom Frans Maurits Hostyn, Halle (BE); Manabu Onishi, Tokyo (JP); Shunkichi Shimizu, Tokyo (JP); Takahiro Nishikawa, Kanagawa (JP)

(73) Assignees: Sony Corporation (JP); Sony Europe Limited (GB)

( * ) Notice: Subject to any disclaimer, the term of this patent is extended or adjusted under 35 U.S.C. 154(b) by 605 days.

(21) Appl. No.: 11/879,036

(22) Filed: Jul. 13, 2007

(65) Prior Publication Data

US 2008/0052408 A1 Feb. 28, 2008

(30) Foreign Application Priority Data

Jul. 14, 2006 (JP) .............................. P2006-194925

(51) Int. Cl.
*H04N 21/443* (2011.01)
*H04N 5/783* (2006.01)
(Continued)

(52) U.S. Cl.
CPC .......... *H04N 21/443* (2013.01); *H04L 65/4069* (2013.01); *H04L 65/80* (2013.01);
(Continued)

(58) Field of Classification Search
CPC ................... H04N 21/4384; H04N 21/47202; H04N 5/76; H04N 5/783; H04N 5/445

USPC ........ 709/206, 231; 725/32, 36, 136; 386/46, 386/68, E5.052; 348/E5.006
See application file for complete search history.

(56) References Cited

U.S. PATENT DOCUMENTS 5,557,724 A * 9/1996 Sampat et al. .................. 725/43
5,768,561 A * 6/1998 Wise ............................... 710/63
(Continued)

FOREIGN PATENT DOCUMENTS

EP         1622386 A2   2/2006
JP      2004-356695     12/2004
(Continued)

OTHER PUBLICATIONS

Extended European Search Report, Nov. 10, 2011.

*Primary Examiner* — Wing F Chan
*Assistant Examiner* — Benjamin M Thieu
(74) *Attorney, Agent, or Firm* — Lerner, David, Littenberg, Krumholz & Mentlik, LLP

(57) ABSTRACT

A data transmission system may have a sending apparatus that sends streaming data, and a receiving apparatus that receives the streaming data and transmits a request of switch of the streaming data to the sending apparatus, in which the sending apparatus may switch the streaming data in response to the received request. The receiving apparatus may include a receiving section, a storage section that stores the streaming data temporarily and transfers it, an operation-detecting section that detects whether a user operates the request, and a control section that controls a transfer rate of the streaming data stored in the storage section to fast-forward the streaming data when the operation-detecting section detects that the user's operation. The sending apparatus may include an information-adding section that adds to the streaming data additional information on the user's operation when receiving a notice of user's operation, and a sending section that sends the additional-information-added streaming data.

11 Claims, 22 Drawing Sheets

(51) Int. Cl.
*H04N 21/433* (2011.01)
*H04N 21/438* (2011.01)
*H04N 21/44* (2011.01)
*H04N 21/442* (2011.01)
*H04N 21/472* (2011.01)
*H04N 21/6587* (2011.01)
*H04L 29/06* (2006.01)

(52) U.S. Cl.
CPC .......... *H04N 5/783* (2013.01); *H04N 21/4331* (2013.01); *H04N 21/4383* (2013.01); *H04N 21/44016* (2013.01); *H04N 21/44222* (2013.01); *H04N 21/47202* (2013.01); *H04N 21/6587* (2013.01)

(56) References Cited

U.S. PATENT DOCUMENTS

| | | | | |
|---|---|---|---|---|
| 6,035,091 | A * | 3/2000 | Kazo | 386/200 |
| 6,356,545 | B1 * | 3/2002 | Vargo et al. | 370/355 |
| 6,760,917 | B2 * | 7/2004 | De Vos et al. | 725/94 |
| 8,131,646 | B2 * | 3/2012 | Kocher et al. | 705/54 |
| 8,152,308 | B2 * | 4/2012 | Ahn et al. | 353/39 |
| 2002/0011988 | A1 * | 1/2002 | Sai et al. | 345/156 |
| 2002/0144262 | A1 * | 10/2002 | Plotnick et al. | 725/32 |
| 2002/0174430 | A1 * | 11/2002 | Ellis et al. | 725/46 |
| 2003/0099457 | A1 * | 5/2003 | Takahashi et al. | 386/46 |
| 2004/0034874 | A1 * | 2/2004 | Hord et al. | 725/136 |
| 2004/0103429 | A1 * | 5/2004 | Carlucci et al. | 725/32 |
| 2004/0250294 | A1 * | 12/2004 | Kim | 725/135 |
| 2005/0076359 | A1 * | 4/2005 | Pierson et al. | 725/32 |
| 2005/0091690 | A1 * | 4/2005 | Delpuch et al. | 725/88 |
| 2005/0166255 | A1 * | 7/2005 | Hallberg et al. | 725/134 |
| 2005/0198681 | A1 | 9/2005 | Park | |
| 2006/0013554 | A1 * | 1/2006 | Poslinski | 386/46 |
| 2006/0095472 | A1 | 5/2006 | Krikorian et al. | |
| 2006/0230176 | A1 * | 10/2006 | Dacosta | 709/235 |
| 2007/0143800 | A1 * | 6/2007 | Salomons | 725/74 |
| 2009/0132352 | A1 * | 5/2009 | Kerven et al. | 705/14 |

FOREIGN PATENT DOCUMENTS

| | | |
|---|---|---|
| WO | 2004/062291 A1 | 7/2004 |
| WO | 2005/122025 A1 | 12/2005 |
| WO | 2006/007352 A1 | 1/2006 |

* cited by examiner ns of data like a hatched region of the streaming data in the buffer 24 as shown in FIG. 3. If a communication state then becomes instable in the network 12, the client 13 reduces the communication rate to receive the streaming data so that the buffer 24 stores a reduced amount of data like a hatched region of the streaming data in the buffer 24 as shown in FIG. 4.

DATA TRANSMISSION SYSTEM, RECEIVING APPARATUS, AND RECEIVING METHOD AS WELL AS SENDING APPARATUS AND SENDING METHOD

CROSS-REFERENCE TO RELATED APPLICATIONS

This application claims priority from Japanese Patent Application No. JP 2006-194925 filed in the Japanese Patent Office on Jul. 14, 2006, the entire content of which is incorporated herein by reference.

BACKGROUND OF THE INVENTION

1. Field of the Invention

The invention relates to a data transmission system, a receiving apparatus, and a receiving method as well as a sending apparatus and a sending method. More specifically, it relates to a data-streaming system and the like.

2. Description of Related Art

Recently, many services in which image data, audio data or the like has been transmitted with a streaming scheme have been provided. A terminal that receives streaming data with the streaming scheme generally has a buffer which stores the streaming data temporarily, in order to improve instability in transmission and reception of data in a network and reproduce the streaming data smoothly.

FIG. 1 shows a configuration of a data-streaming system 1 as related art. In the data-streaming system 1 as related art, a server 11 that sends streaming data such as image data and audio data sends the streaming data to a client 13 through a network 12 in response to any requests by the client 13.

It is to be noted that the server 11 installs, for example, a television tuner therein and can receive any image and audio signals from an exterior device such as a digital versatile disk (DVD) player. Based on a control signal received from an outside, the server 11 also can switch between image and audio signals received from the television tuner and image and audio signals received from the DVD player or change the channel of the television tuner. Moreover, it is possible to control, through the server 11, operations of an exterior device such as a DVD player.

The client 13 includes a receiving section 21, buffers 22 and 24, a decoder 23, a reproduction section 26, and an output section 27, as shown in FIG. 2.

The receiving section 21 receives the streaming data from the server 11 through the network 12 and de-modulates the streaming data. The buffer 22 receives and stores the streaming data.

The buffer 22 also supplies the stored streaming data to the decoder 23 at a time when the decoder 23 performs decode processing. The decoder 23 receives the streaming data from the buffer 22 and decodes the image data and the audio data, separately, to supply the decoded image data and audio data to the buffer 24 where they are stored.

The buffer 24 supplies the stored streaming data to the reproduction section 26. The reproduction section 26 reproduces the streaming data received from the buffer 24 and supplies the reproduced stream data to the output section 27.

The output section 27 is constituted of a display for displaying an image, a speaker for sounding an audio and/or the like and outputs an image based on the streaming data and/or an audio corresponding to the image.

If a communication state is stable in the network 12, the client 13 can keep a sufficient communication rate to receive the streaming data so that the buffer 24 can store a sufficient amount of data like a hatched region of the streaming data in the buffer 24 as shown in FIG. 3. If a communication state then becomes instable in the network 12, the client 13 reduces the communication rate to receive the streaming data so that the buffer 24 stores a reduced amount of data like a hatched region of the streaming data in the buffer 24 as shown in FIG. 4.

Although the amount of data of the streaming data stored in the buffer 24 is reduced, the reproduction section 26 reproduces the streaming data stored in the buffer 24, which is received from a reproducing-speed-controlling section, not shown, so that reproducing operation does not stop even when the amount of data of the streaming data stored in the buffer 24 is reduced, thereby enabling the streaming data to be smoothly reproduced. Namely, the streaming data is once stored in the buffer 24 and the reproduction section 26 reproduces the streaming data after a fixed period of time has been elapsed.

It is to be noted that, in FIGS. 3 and 4, in order to simplify the description, only the buffer 24 and the reproduction section 26 are illustrated among the sections constituting the client 13 shown in FIG. 2, and the buffer 22 is omitted. Further, in FIGS. 3 and 4, triangle marks marked under the buffer 24 indicate an amount of data stored in the buffer. The indicated amount of data in the buffer is increased in accordance with positions from left end to right end in each of the figures.

As described above, however, the reproduction section 26 reproduces the streaming data stored in the buffer 24 after a fixed period of time has been elapsed so that if a user performs a fixed operation to instruct change of channels of the television tuner or the like, it is difficult to reproduce the streaming data after the user's operation, which corresponds to the operation, unless the streaming data before the operation, which is stored in the buffer 24, has been completely reproduced.

Thus, the user may view and hear the streaming data after his or her operation merely after he or she views and hears the streaming data before the operation, which is stored in the buffer 24, for a fixed period of time, namely, after the streaming data before the operation has been completely reproduced.

FIG. 5 illustrates items of streaming data stored in the buffer 24 on user's operation.

In FIG. 5, time is elapsed on a time direction from an upper side toward a lower side. States in the server 11, the network 12, the buffer 24, and the reproduction section 26, which are shown at a top in FIG. 5, are referred to as "State 1"; States in the server 11, the network 12, the buffer 24, and the reproduction section 26, which are shown at a second top in FIG. 5, are referred to as "State 2"; States in the server 11, the network 12, the buffer 24, and the reproduction section 26, which are shown at a middle in FIG. 5, are referred to as "State 3"; States in the server 11, the network 12, the buffer 24, and the reproduction section 26, which are shown at a second bottom in FIG. 5, are referred to as "State 4"; and States in the server 11, the network 12, the buffer 24, and the reproduction section 26, which are shown at a bottom in FIG. 5, are referred to as "State 5".

In other words, in FIG. 5, states in the server 11, the network 12, the buffer 24, and the reproduction section 26 are respectively transferred from the state 1 to the state 5 through the states 2, 3, 4 as time is elapsed.

It is to be noted that in FIG. 5, as in the cases of FIGS. 3 and 4, in order to simplify the illustration, only the buffer 24 and the reproduction section 26 are illustrated among the sections constituting the client 13 shown in FIG. 2. Further, in FIG. 5, squares in white indicate the streaming data before a user performs any operations while squares in black indicate the streaming data after a user has performed any operations.

At State 1 shown in FIG. 5, the server 11 switches the streaming data to be sent, from the streaming data before the operation to the streaming data after the operation, based on a notice of changing the channels received from the client 13 if a user performs a fixed operation such as channel changing. In the moment, the client 13 has yet received no streaming data after the operation from the server 11 so that the buffer 24 stores the streaming data before the operation and the reproduction section 26 reproduces the streaming data before the operation.

The buffer 24 is constituted of a first-in first-out (FIFO) memory. When the client 13 receives the streaming data after the operation from the server 11 through the network 12, the buffer 24 reads items of the data in a stored order thereof, as indicated at States 2 through 4. Accordingly, the buffer 24 reads items of the streaming data before the operation in order. In this moment, since items of the data read out of the buffer 24 are all the streaming data before the operation, the reproduction section 26 reproduces the streaming data before the operation.

The buffer 24 reads the streaming data after the operation when any streaming data after the operation becomes the oldest one among items of the streaming data stored in the buffer 24, and the reproduction section 26 then reproduces it as indicated at State 5.

Moreover, there is a method of reproducing the streaming data after the operation without any delay by deleting contents in the buffer 24 that stores the streaming data before the operation, namely, by flushing them, on a point of time when a user performs any operation.

FIG. 6 illustrates the flush operation in the buffer 24 on a point of time when a user performs any operation. It is to be noted that in FIG. 6, in order to simplify the illustration, only the buffer 24 and the reproduction section 26 are illustrated among the sections constituting the client 13.

In FIG. 6, as a case of FIG. 5, states in the server 11, the network 12, the buffer 24, and the reproduction section 26, which are shown at a top in FIG. 6, are referred to as "State 1"; States in the server 11, the network 12, the buffer 24, and the reproduction section 26, which are shown at a middle in FIG. 6, are referred to as "State 2"; and States in the server 11, the network 12, the buffer 24, and the reproduction section 26, which are shown at a bottom in FIG. 5, are referred to as "State 3". In other words, in FIG. 6, states in the server 11, the network 12, the buffer 24, and the reproduction section 26 are respectively transferred from the state 1 to the state 3 through the state 2 as time is elapsed.

In FIG. 6, the server 11 switches the streaming data to be sent, from the streaming data before the operation to the streaming data after the operation, in response to the notice of changing the channels from the client 13, as shown in the State 1, if a user performs a fixed operation such as channel changing. In this moment, the buffer 24 of the client 13 is flushed and then the reproduction section 26 can reproduce the streaming data before the operation.

When the client 13 then receives the streaming data after the operation from the server 11 through the network 12, the buffer 24 has been flushed so that the buffer 24 can store the streaming data after the operation as the oldest stored streaming data as shown in State 2. The reproduction section 26 then reads the streaming data after the operation out of the flushed buffer 24 directly as shown in State 3 and reproduces it.

Thus, in the client 13 as related art in which the buffer 24 is flushed as shown in FIG. 6, the buffer 24 flushes the stored streaming data before the operation and then stores the streaming data after the operation so that the reproduction section 26 can reproduce the streaming data after the operation.

Japanese Patent Application Publication No. 2004-356695has disclosed a data distribution system in which if a user manipulates a remote controller, a threshold value of overflowing is changed to its threshold value for operation that is less than an ordinary threshold value; and if it is determined that an amount of streaming data in the buffer exceeds the threshold value for operation, a period of time up to displaying contents on an display device can be shortened by controlling any reproduction processing to be made rapid.

SUMMARY OF THE INVENTION

As described above, however, in the client 13 shown in FIG. 5, on the operation by a user, the streaming data before the operation, which has been stored in the buffer, is reproduced, and the streaming data after the operation is then reproduced, so that it is difficult to change the data to the streaming data after the operation directly, by which user's operation is not directly reflected, thereby causing the system to be not user-friendly by this delay in the data transfer.

Specifically, as shown in FIG. 5, in the client 13, the reproduction section 26 reproduces the streaming data that has been stored in the buffer 24, after a fixed period of time is elapsed, so that if a user performs any predetermined operations, it is difficult to reproduce the streaming data after the operation, which corresponds to this operation, if the reproduction of the streaming data before the operation, which has been stored in the buffer 24, has been completed. This causes any mal-operation.

A method of reproducing the streaming data after the operation directly has been proposed by flushing the streaming data before the operation stored in the buffer 24 on the user's operation, as illustrated in FIG. 6.

Although, according to this method, the streaming data after the operation from the server 11 can be directly reproduced by flushing the streaming data before the operation stored in the buffer 24, it is also difficult to reproduce the streaming data before the operation, which has been already deleted by the flush. In other words, this deletion of the streaming data before the operation disables a user to view an image on the flushed portions and enables the user to hear an audio ruptured in terms of time.

Particularly, if a user instructs the client 13 to change reproduction speeds in the same contents such as fast-forward reproduction, reverse, pause, slow reproduction in DVD recorder or the like that is connected to the server 11, any rupture occurs in terms of time between the streaming data before the operation and the streaming data after the operation, which may cause any operation by the user to be made inconvenient. For example, as shown in FIG. 7, if a user pauses the system when the streaming data at position 1 is reproduced if the streaming data before the operation is flushed between positions 1 and 2, an image and an audio based on the paused streaming data is viewed and heard at the position 2 because no streaming data before the operation stay between the positions 1 and 2.

It is desirable to provide a data transmission system, a receiving apparatus and a receiving method as well as a sending apparatus and a sending method, which allow any delay in a data transfer to be reduced and prevent the data from being ruptured in terms of time by dynamically changing a reproduction speed of the streaming data that is stored in the buffer on the user's operation.

According to an embodiment of the present invention, there is provided a data transmission system which may contain a sending apparatus that sends streaming data, and a receiving apparatus that receives the streaming data from the sending apparatus and sends a request of switch of the streaming data to the sending apparatus. The sending apparatus may switch the streaming data in response to the request of switch of the streaming data, which is received from the receiving apparatus. The receiving apparatus may include a receiving section that receives the streaming data from the sending apparatus, a storage section that stores the received streaming data temporarily and then, transfers the received streaming data, an operation-detecting section that detects whether a user operates the request of switch of the streaming data, and a control section that controls a transfer rate of the streaming data stored in the storage section and controls a reproduction speed of the streaming data stored in the storage section to perform a fast-forward reproduction of the streaming data stored in the storage section when the operation-detecting section detects that the user operates the request of switch of the streaming data. The sending apparatus may include an information-adding section that adds to the streaming data additional information that the user operates the request of switch of the streaming data when the sending apparatus receives from the receiving apparatus a notice indicating that the user operates the request of switch of the streaming data, and a sending section that sends to the receiving apparatus the streaming data to which the additional information is added.

In the embodiment, when the sending apparatus receives from the receiving apparatus a notice indicating that the user operates the request of switch of the streaming data, additional information that the user operates the request of switch of the streaming data may be added to the streaming data and the streaming data to which the additional information is added may be then sent to the receiving apparatus. The receiving apparatus may receive such the streaming data from the sending apparatus and then, the received streaming data may be temporarily stored and transferred. It may also be detected whether a user operates the request of switch of the streaming data so that a transfer rate of the streaming data can be controlled. If it is detected that a user operates the request of switch of the streaming data, the reproduction speed of the streaming data stored in the storage section may be controlled to perform a fast-forward reproduction of the streaming data stored in the storage section.

This may enable the data to be transmitted with a very small delay and prevent the data from being ruptured in terms of time.

According to another embodiment of the present invention, there is provided a receiving apparatus that may receive streaming data and send a request of switch of the streaming data. The receiving apparatus may contain a receiving section that receives the streaming data, a storage section that stores the received streaming data temporarily and then, transfers the received streaming data, an operation-detecting section that detects whether a user operates the request of switch of the streaming data, and a control section that controls a transfer rate of the streaming data stored in the storage section and controls a reproduction speed of the streaming data stored in the storage section to perform a fast-forward reproduction of the streaming data stored in the storage section when the operation-detecting section detects that the user operates the request of switch of the streaming data.

In this embodiment of present invention, the receiving apparatus may receive the streaming data from the sending apparatus and then, the received streaming data may be temporarily stored in the storage section and then transferred. It may also be detected whether a user operates the request of switch of the streaming data so that a transfer rate of the streaming data can be controlled. If it is detected that a user operates the request of switch of the streaming data, the reproduction speed of the streaming data stored in the storage section may be controlled to perform a fast-forward reproduction of the streaming data stored in the storage section.

This may enable the data to be received with a very small delay and prevent the data from being ruptured in terms of time.

Further, a sending section may send to the sending apparatus a notice that when an operation-detecting section detects that a user operates the request of switch of the streaming data, the user may operate the request of switch of the streaming data to allow to be added to the streaming data in the sending apparatus additional information that the user operates the request of switch of the streaming data. The control section may control the reproduction speed of the streaming data stored in the storage section to perform a fast-forward reproduction until the additional information that is added to the streaming data stored in the storage section is detected.

The control section may also control the reproduction speed of the streaming data stored in the storage section to perform a slow reproduction of the streaming data stored in the storage section until an amount of streaming data stored in the storage section become a predetermined amount when the additional information is detected.

A sending section may send to the sending apparatus a notice that when an operation-detecting section detects that a user operates the request of switch of the streaming data, the user operates the request of switch of the streaming data to allow to be added to the streaming data in the sending apparatus additional information that the user operates the request of switch of the streaming data. The control section may control the reproduction speed of the streaming data stored in the storage section to start a fast-forward reproduction of the streaming data stored in the storage section when it is detected that the additional information that is added to the streaming data stored in the storage section is reached to the receiving apparatus and to reproduce the streaming data stored in the storage section until a part thereof to which the additional information is added for a period of predetermined time.

The period of predetermined time may be set to one second or less.

The control section may control the reproduction speed of the streaming data stored in the storage section to perform a slow reproduction of the streaming data stored in the storage section until the streaming data stored in the storage section is reached to a predetermined amount after the fast-forward reproduction of the streaming data has been completed.

An information-adding section may add additional information that, when an operation-detecting section detects that a user operates the request of switch of the streaming data, the user operates the request of switch of the streaming data to the streaming data last received from the sending apparatus among items of the streaming data stored in the storage section. The control section may control the reproduction speed of the streaming data stored in the storage section to perform a fast-forward reproduction of the streaming data stored in the storage section until the additional information added to the streaming data stored in the storage section is detected.

The control section may control the reproduction speed of the streaming data stored in the storage section to perform a slow reproduction of the streaming data stored in the storage section until the streaming data stored in the storage section is reached to a predetermined amount when the additional information is detected.

A storage section may store a point of time added to the streaming data last received from the sending apparatus among items of the streaming data stored in the storage section when an operation-detecting section detects that a user operates the request of switch of the streaming data. The control section may control the reproduction speed of the streaming data stored in the storage section to perform a fast-forward reproduction of the streaming data stored in the storage section until the point of time added to the reproduced streaming data elapses over the stored point of time.

The control section may control the reproduction speed of the streaming data stored in the storage section to perform a slow reproduction of the streaming data stored in the storage section until the streaming data stored in the storage section is reached to a predetermined amount when the additional information is detected.

An operation section operated by a user may be provided to instruct switch of external equipment that supplies the streaming data, switch of channel, or reproduction, reverse, fast-forward, pause or stop of external device. The user's operation may contain instruction on switch of equipment that sends the streaming data, switch of channel, or reproduction, reverse, fast-forward, pause or stop of the external device.

According to further embodiment of the invention, there is provided a receiving method of a receiving apparatus that may receive streaming data from a sending apparatus and transmit a request of switch of the streaming data to the sending apparatus. The receiving method may include receiving the streaming data from the sending apparatus by a receiving section of the receiving apparatus, storing the received streaming data temporarily in a storage section of the receiving apparatus and then, transferring the received streaming data, detecting by an operation-detecting section of the receiving apparatus whether a user operates the request of switch of the streaming data, and controlling a reproduction speed of the streaming data stored in the storage section to perform a fast-forward reproduction of the streaming data stored in the storage section when the operation-detecting section detects that the user operates the request of switch of the streaming data.

According to additional embodiment of the invention, there is provided a program product that may allow a computer to perform the above receiving method of the receiving apparatus that receives streaming data from a sending apparatus and transmits a request of switch of the streaming data to the sending apparatus.

In these embodiments of present invention, the receiving apparatus may receive the streaming data from the sending apparatus and then, the received streaming data may be temporarily stored and transferred. It may also be detected whether a user operates the request of switch of the streaming data so that a transfer rate of the streaming data can be controlled. If it is detected that a user operates the request of switch of the streaming data, the reproduction speed of the streaming data stored in the storage section may be controlled to perform a fast-forward reproduction of the streaming data stored in the storage section.

This may enable the data to be received with a very small delay and prevents the data from being ruptured in terms of time.

According to still another embodiment of the invention, there is provided a sending apparatus that may send streaming data to each of the receiving apparatuses and switch the streaming data to send the switched streaming data in response to the request of switch of the streaming data, which is received from any receiving apparatuses. The sending apparatus may contain an information-adding section that adds to the streaming data additional information that the user operates the request of switch of the streaming data when the sending apparatus receives from the receiving apparatus a notice indicating that the user operates the request of switch of the streaming data, and a sending section that sends to the receiving apparatus the streaming data to which the additional information is added.

In this embodiment, when the sending apparatus receives from the receiving apparatus a notice indicating that the user operates the request of switch of the streaming data, additional information that the user operates the request of switch of the streaming data may be added to the streaming data and the streaming data to which the additional information is added may then be sent to the receiving apparatus.

This may enable the data to be sent with a very small delay and prevent the data from being ruptured in terms of time.

A storage section may store the streaming data temporarily, and flush the streaming data stored therein when the user operates the request of switch of the streaming data.

The storage section may flush the streaming data stored therein with only the streaming data constituting one image completely being remained when the user operates the request of switch of the streaming data.

A receiving section may be provided such that it receives a notice indicating that the user operates the request of switch of the streaming data from the receiving apparatus. The information-adding section may add the additional information to the streaming data in response to the received notice.

The user's operation may contain instruction on switch of external equipment that supplies the streaming data, switch of channel, or reproduction, reverse, fast-forward, pause or stop of the streaming data.

According to still further embodiment of the invention, there is provided a sending method of a sending apparatus that may send streaming data to each of the receiving apparatuses and switches the streaming data to send the streaming data in response to the request of switch of the streaming data, which is received from any receiving apparatuses. The method may contain adding to the streaming data additional information that a user operates the request of switch of the streaming data by an information-adding section of the sending apparatus when the sending apparatus receives a notice indicating that the user operates the request of switch of the streaming data from the receiving apparatus, and sending the streaming data to which the additional information is added by a sending section of the sending apparatus.

According to still additional embodiment of the invention, there is provided a program product that may allow a computer to perform the above sending method of the sending apparatus that sends streaming data to each of the receiving apparatuses and switches the streaming data to send the switched streaming data in response to the request of switch of the streaming data, which is received from the any receiving apparatuses.

In these embodiments of present invention, when the sending apparatus receives from the receiving apparatus a notice indicating that the user operates the request of switch of the streaming data, additional information that the user operates the request of switch of the streaming data may be added to the streaming data and the streaming data to which the additional information is added is then sent to the receiving apparatus.

This may enable the data to be sent with a very small delay and prevent the data from being ruptured in terms of time.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION

Although the following will describe embodiments of the present invention, on all matters concerning the embodiments described in the specification and drawings, an embodiment, if any, that is described in the specification and drawings but is not described as an embodiment corresponding to any claims, should be not understood to be not corresponded to the claims. In reverse, if an embodiment is described in the specification and drawings as an embodiment corresponding to any claims, this embodiment should be not understood to be not corresponded to a claim other than the claim.

Figure 1:
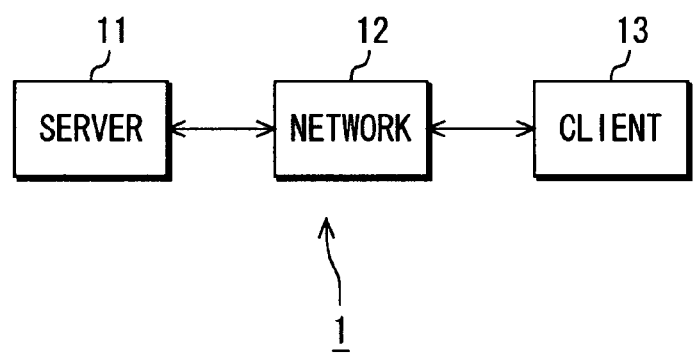
FIG. 1 is a block diagram for showing a configuration of a data-streaming system 1 as related art.
Figure 2:
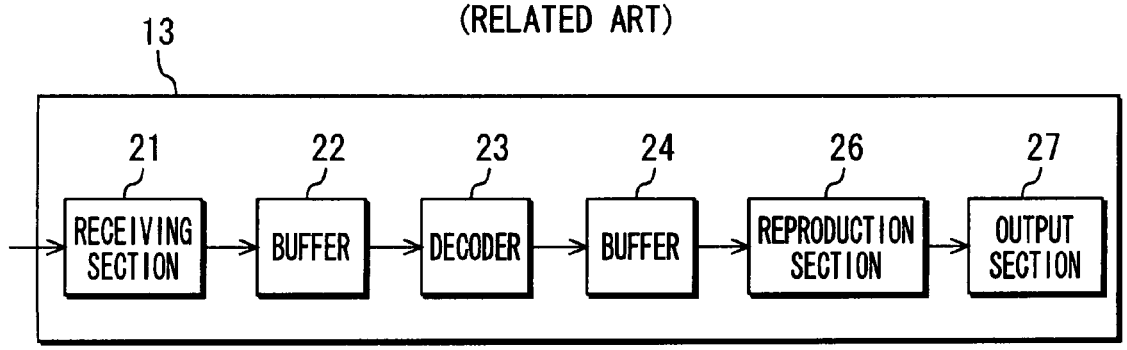
FIG. 2 is a block diagram for showing a configuration of a client as related art.
Figure 3:
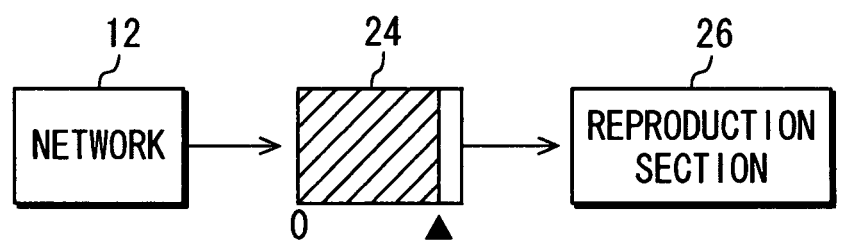
FIG. 3 is a diagram for illustrating state in a buffer.
Figure 4:
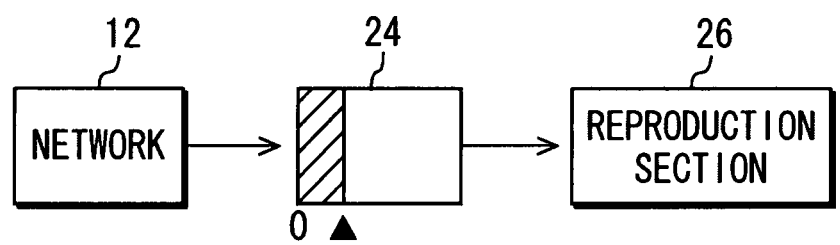
FIG. 4 is a diagram for illustrating state in a buffer.
Figure 5:
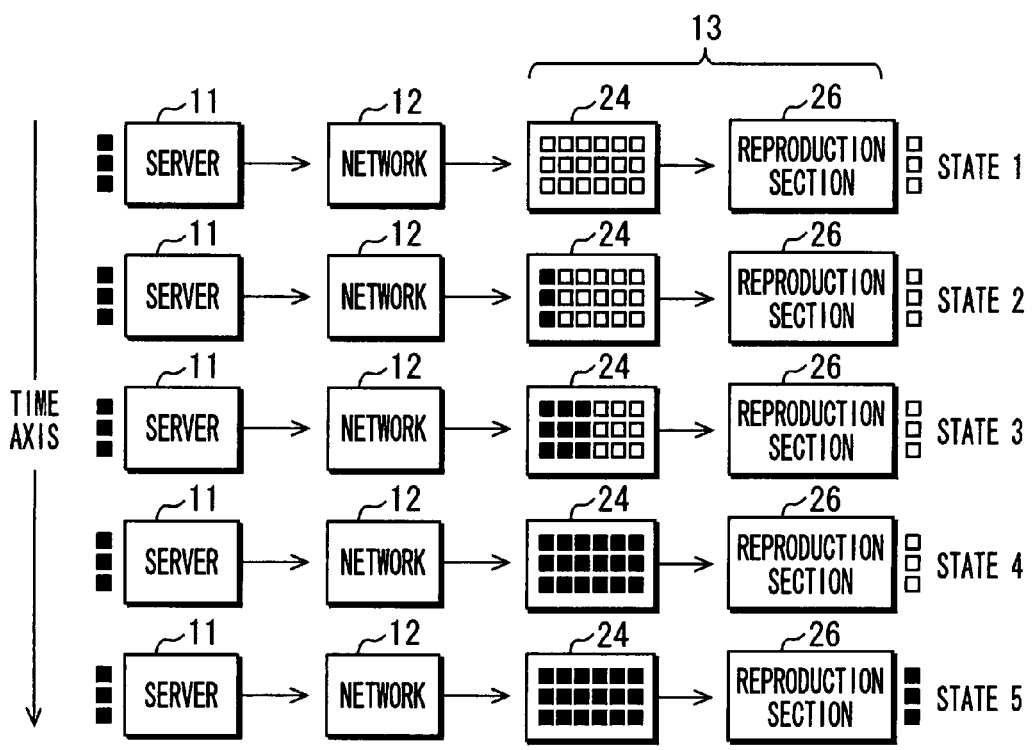
FIG. 5 is a diagram for illustrating items of streaming data stored in the buffer on user's operation.
Figure 6:
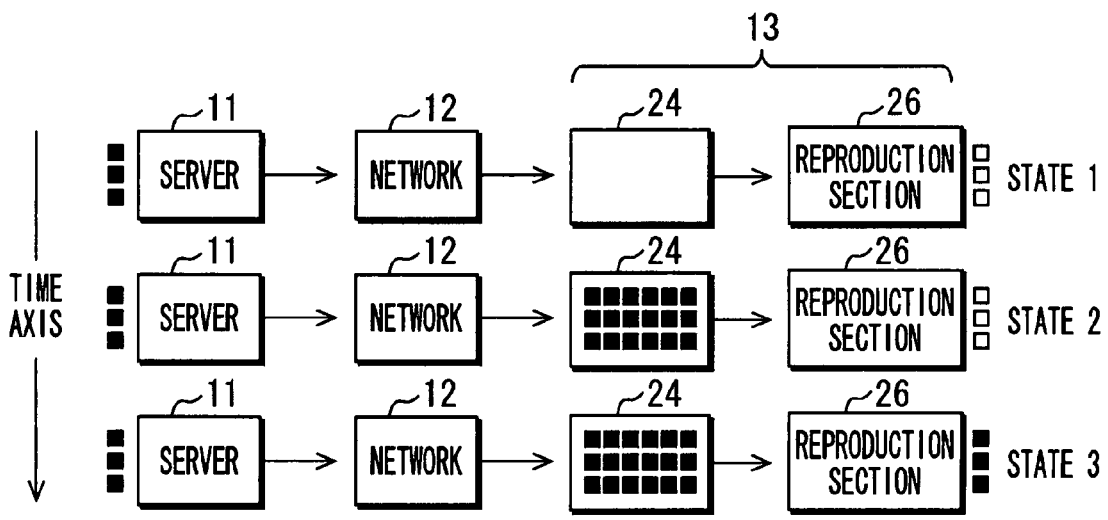
FIG. 6 is a diagram for illustrating flushing streaming data stored in the buffer on user's operation.
Figure 7:
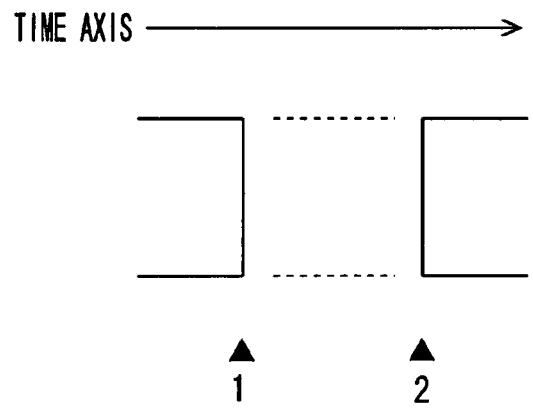
FIG. 7 is a diagram for illustrating streaming data after it is flushed.
Figure 8:
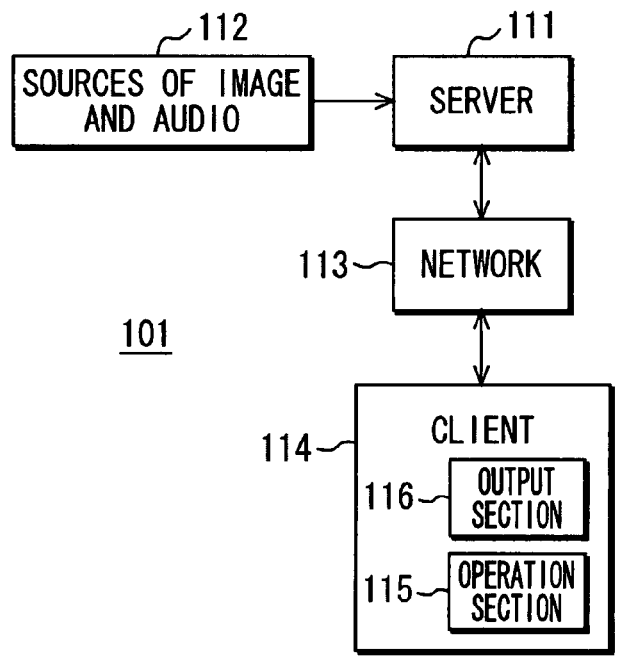
FIG. 8 is a block diagram for showing a configuration of an embodiment of a data-streaming system 101 to which the present invention is applied.

The following will describe embodiments of the present invention with reference to the attached drawings. FIG. 8 shows a configuration of an embodiment of a data-streaming system 101 to which the present invention is applied.

The data-streaming system 101 contains a server 111, sources of image and audio 112, a network 113, and a client 114. The client 114 contains an operation section 115 and an output section 116.

The server 111 is constituted of a special-purpose server or the like that sends contents such as a moving image with a streaming scheme. The server 111 sends the streaming data, which is obtained by performing predetermined processing on image and audio signals supplied from the sources of image and audio 112, to the client(s) 114 via the network 113.

The sources of image and audio 112 are signal sources of image information and/or audio information with an analog or digital form. The sources of image and audio 112 may be constituted of a tuner that receives a broadcast signal through an antenna, not shown, and outputs image and audio signals, and an external device such as a DVD recorder, a hard disk recorder, a video tape recorder. The sources of image and audio 112 may be also constituted of sources of image information and/or audio information with various kinds of files. The sources of image and audio 112 may be also included in the server 111.

The network 113 is connected to the server 111 and the client 114. The network 113 is constituted of so-called wireless local area network (LAN) that is a network using wireless communication. The network 113 allows the sever 111 and each of the clients 114 to be communicated to each other according to any protocol such as real-time transport protocol (RTP).

It is to be noted that as a wireless LAN standard, for example, the Institute of Electrical and Electronic Engineers, Inc. (IEEE) 802.11 is used. The network 113, however, may be constituted of, in addition to the wireless LAN, a network using a wired communication following Ethernet (trademark) or the like, networks in which they are connected to each other such as the Internet, a communication channel and the like. Another protocol other than RTP may be used therein if the protocol contains time information such as timestamp.

The client 114 is constituted of a device that can be connected to the network 113, such as a personal computer, a game machine or a mobile phone. The client 114 receives streaming data from the server 111 through the network 113. In the client 114, the output section 116 is supplied with the received streaming data. The output section 116 displays an image based on the received streaming data on a display such as liquid crystal display and sounds audio corresponding to the displayed image by a speaker. Thus, a user can view and/or hear the streaming data from the server 111.

If the user operates the client 114 through the operation section 115 provided in the client 114, the client 114 sends to the server 111 through the network 113 a request corresponding to his or her operation. The server 111 then receives the request and sends streaming data corresponding to the request received from the client 114, to the client 114 through the network 113.

It is to be noted that although, in FIG. 8, the data-streaming system 101 is provided with the server 111, the network 113, and the client 114 one by one, they may be respectively constituted of plural ones. Of course, the operation section 115 and the output section 116 may be also constituted of plural ones, respectively, though they are shown as one. Further, although, in FIG. 8, the data-streaming system 101 is provided with the sources of image and audio 112, the sources may be constituted of a source of image or audio.

Figure 9:
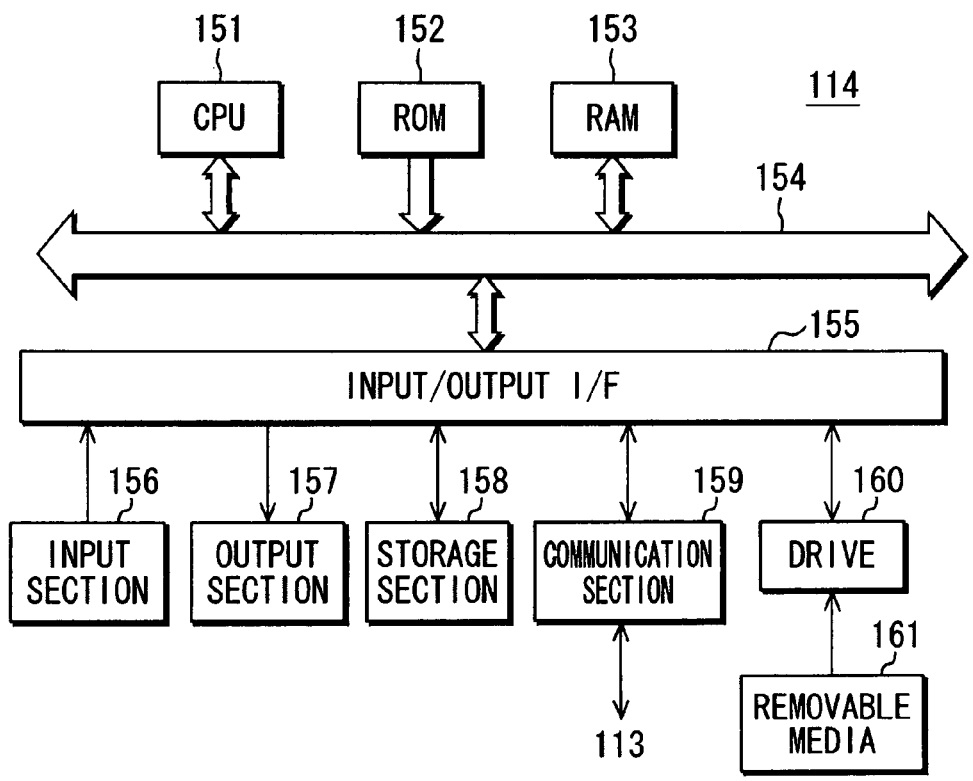
FIG. 9 is a block diagram for showing a hardware configuration of a client.

FIG. 9 shows a hardware configuration of the client 114.

A central processing unit (CPU) 151 in the client 114 executes various kinds of processing based on programs stored on a read only memory (ROM) 152 or a storage section 158. On a random access memory (RAM) 153, programs to be executed on the CPU 151, data to be used therein, and the like are properly stored. These CPU 151, ROM 152, and RAM 153 are connected to each other via bus 154.

To the CPU 151, an input/output interface 155 is connected through the bus 154. To the input/output interface 155, an input section 156, which is constituted of a keyboard, a mouse, a microphone or the like, and an output section 157, which is constituted of a display, a speaker or the like, are connected. The CPU 151 executes various kinds of processing corresponding to a command input by the input section 156. The CPU 151 then controls the output section 157 to output an image, an audio, and the like that are obtained from results of the processing. It is to be noted that the input section 156 and the output section 157 respectively correspond to the operation section 115 and the output section 116 shown in FIG. 8.

The storage section 158 that is connected to the input/output interface 155 is constituted of, for example, a hard disk, which stores the programs to be executed by the CPU 151 and various kinds of data to be used therein. A communication section 159 communicates with an external device through the network 113.

Any programs may be acquired from an external server for download through the communication section 159 and stored on the storage section 158.

A drive 160 connected to the input/output interface 155 drives removable media 161 such as a magnetic disk, an optical disk, a magneto optical disk, a semiconductor memory or the like when they are mounted, to acquire the programs and data stored therein. The programs and data thus acquired are transferred to the storage section 158 as necessary and stored therein.

The sever 111 has also the same hardware configuration as that of the client 114, a detailed description of which will be omitted. The server 111 and the client 114 are not limited to internal configurations shown in FIG. 9, to or from which any functions may be added or deleted as necessary so that the server 111 and the client 114 can have a configuration corresponding to the functions.

Figure 10:
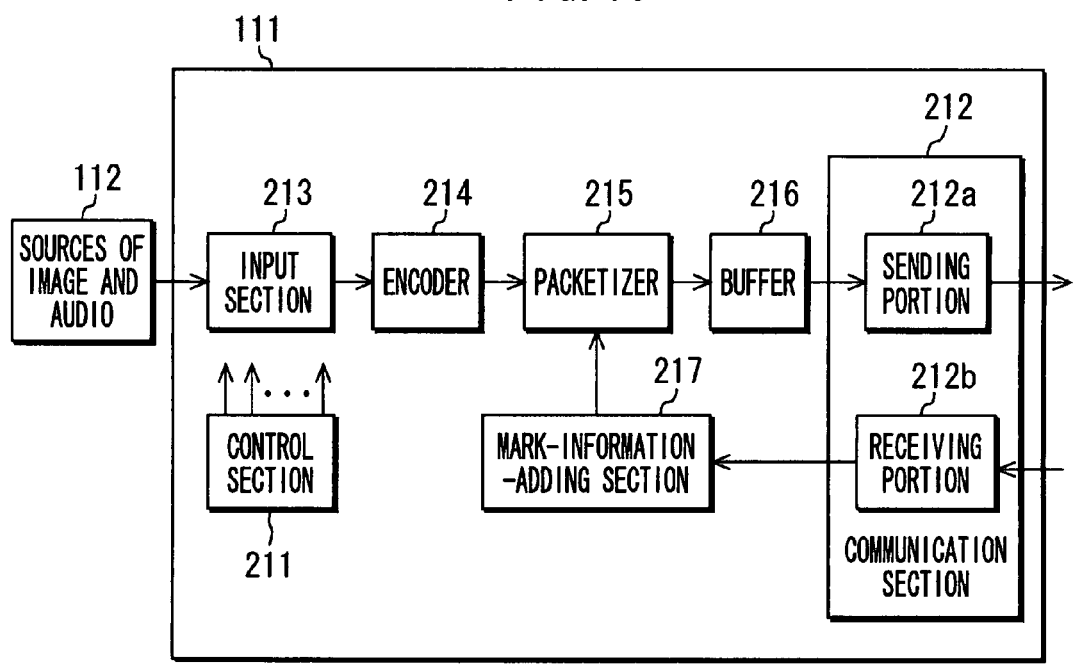
FIG. 10 is a block diagram for showing a functional configuration of a server.

In other words, the hardware configuration of the server 111 is not limited to that shown in FIG. 9, and the server 111 may have at least a functional configuration as shown in FIG. 10, which will be described later.

FIG. 10 shows such a functional configuration of the server 111.

The server 111 contains a control section 211, a communication section 212, an input section 213, an encoder 214, a packetizer 215, a buffer 216, and a mark-information-adding section 217.

The control section 211 controls operations of various sections of the server 111.

The communication section 212 communicates with any external device such as the client 114 through the network 113 under the control of the control section 211. The communication section 212 contains a sending portion 212*a* configured to send various kinds of packets and a receiving portion 212*b* configured to receive various kinds of packets.

The input section 213, which corresponds to the input section 156 shown in FIG. 9, receives an image signal and an audio signal from the sources of image and audio 112 and supplies the image signal and the audio signal thus received to the encoder 214 under the control of the control section 211. If the image signal and the audio signal from the sources of image and audio 112 are analog data signals, an A/D converter, not shown, that converts the image signal and the audio signal from the sources of image and audio 112 from analog data to digital data may be added thereto and supply the encoder 214 with digital data obtained by such the conversion.

The encoder 214 encodes the image signal and the audio signal from the sources of image and audio 112 according to a predetermined code scheme and supplies the packetizer 215 with the image signal and the audio signal thus encoded. The following will describe this embodiment in a case where moving picture experts group phase 4 (MPEG4) is used as the code scheme of the image signal and the audio signal, but any other code scheme such as MPEG2, advanced video coding (AVC), H.264 can be used.

The packetizer 215 receives the image signal and the audio signal and contains the image data in a packet of RTP scheme to generate a RTP packet. The packetizer 215 supplies the buffer 216 with the generated RTP packet and the buffer 216 stores the generated RTP packet.

It is to be noted that if the image signal and the audio signal from the sources of image and audio 112 have been already converted to those with MPEG4, the packetizer 215 directly contains data with MPEG4 received from the input section 213 in a packet of RTP scheme to generate a RTP packet because coding processing in the encoder 214 is unnecessary.

The receiving portion 212*b* receives a request for switching operation from the client 114 through the network 113. The receiving portion 212*b* supplies the mark-information-adding section 217 with the received request for switching operation.

The request for switching operation is referred to as a request that the client 114 sends to the server 111 through the network 113 when a user manipulating the client 114 performs predetermined operations such as switches of channels in the tuner by utilizing a screen for remote control displayed on the output section 116 in the client 114. This request enables the server 111 to execute any operations corresponding to the user's operations. The predetermined operations by the user are of switches of the channels, switches of external devices that supply the streaming data, and operations of trick plays such as reproduction, reverse reproduction, fast-forward reproduction, pause or stop to the external device such as a DVD recorder that outputs the streaming data, a hard disk recorder, and a video tape recorder.

The mark-information-adding section 217 adds any mark information to the RTP packet generated by the packetizer 215 based on the request for switching operation that is received from the receiving portion 212*b*.

Herein, the mark information is referred to as information indicating that a predetermined operation has been performed by a user that manipulates the client 114. The predetermined operation by the user is of switches of the channels in a tuner, operation of trick plays or the like.

The packetizer 215, if the mark-information-adding section 217 adds any mark information to the RTP packet, supplies the buffer 216 with the RTP packet to which the mark information is added, and the buffer 216 stores such the RTP packet.

The buffer 216 is constituted of, for example, a memory of FIFO type having, for example, a ring buffer configuration and stores the RTP packet received from the packetizer 215 temporarily. In other words, the RTP packets stored in the buffer 216 are supplied to the communication section 212 in an older stored order.

The sending portion 212*a* sends the RTP packets stored in the buffer 216 to the client 114 through the network 113. This enables the server 111 to send the streaming data to the client 114 through the network 113.

Figure 11:
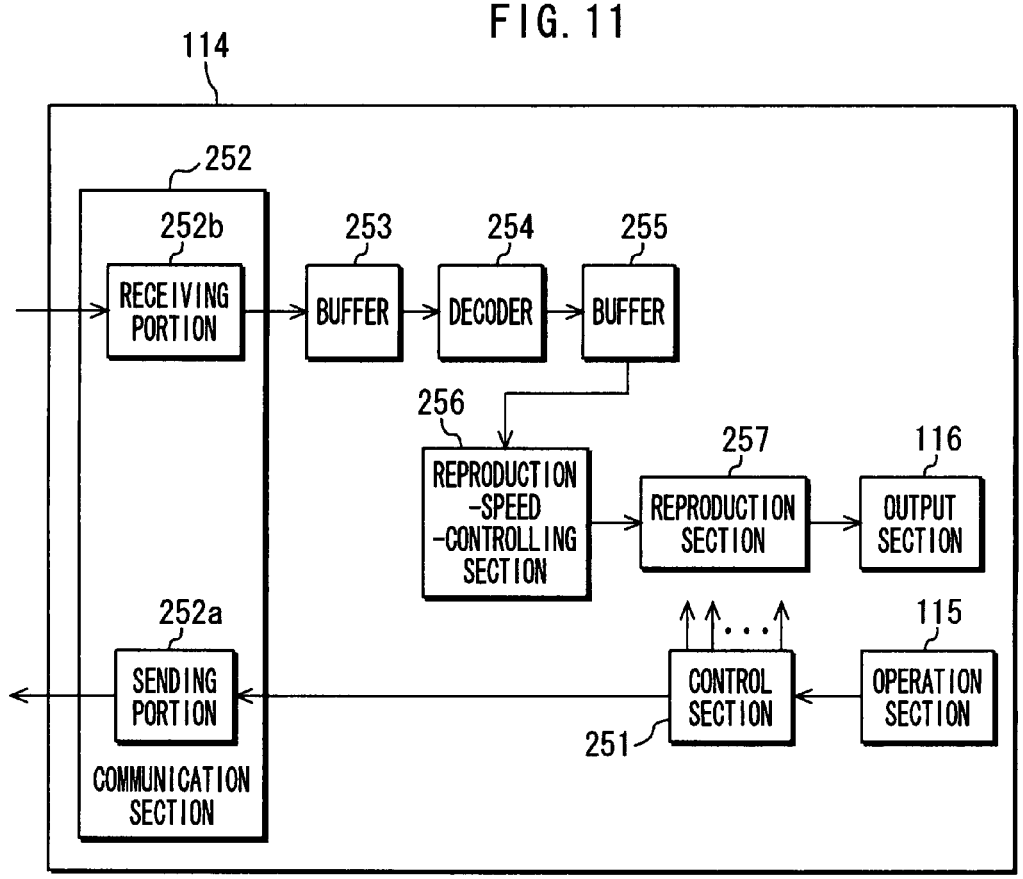
FIG. 11 is a block diagram for showing a functional configuration of a client.

The hardware configuration of the client 114 is not limited to that shown in FIG. 9, and the client 114 may have at least a functional configuration as shown in FIG. 11, which will be described later.

FIG. 11 shows such a functional configuration of the client 114.

The client 114 contains an operation section 115, an output section 116, a control section 251, a communication section 252, a buffer 253, a decoder 254, a buffer 255, a reproduction-speed-controlling section 256, and a reproduction section 257.

The control section 251 controls operations of various sections in the client 114.

The communication section 252, which corresponds to the communication section 159 shown in FIG. 9, communicates with an external device through the network 113 under the control of the control section 251. The communication section contains a sending portion 252*a* that sends various kinds of packets and a receiving portion 252*b* that receives various kinds of packets.

The receiving portion 252*b* receives the streaming data from the server 111 through the network 113 and demodulates this streaming data to supply it to the buffer 253 which stores the streaming data. The streaming data stored in the buffer 253 is then supplied to the decoder 254 according to a point of time when the decoder 254 performs processing.

The decoder 254 separately decodes the image data and the audio data from the streaming data stored in the buffer 253 and supplies the buffer 255 with the streaming data obtained by the decoding. The buffer 255 stores the decoded streaming data.

The decoder 254 can decode only, for example, I frame in the streaming data stored in the buffer 253 under the control of the control section 251 or can decode the streaming data stored in the buffer 253 and supplies the buffer 255 with only special frame such that one frame is selected among eight frames in the streaming data obtained by the decoding.

The buffer 255 is constituted of, for example, a memory of FIFO type having, for example, a ring buffer configuration and stores the RTP packet received from the decoder 254. In other words, the streaming data stored in the buffer 255 is supplied to the reproduction-speed-controlling section 256 in an older stored order.

It is to be noted that capacity of the buffer 255 is set to have some enough room taking in consideration transmission speed of the network 113 and processing performance of the server 111 and the client 114.

The reproduction-speed-controlling section 256 controls the reproduction speed of the streaming data stored in the buffer 255 so that the streaming data can be reproduced at a reproduction speed corresponding to a reproduction mode, a detailed description of which will be described later. In other words, the streaming data stored in the buffer 255 is fetched by the reproduction-speed-controlling section 256 which supplies the reproduction section 257 with it.

The reproduction mode of this embodiment is classified into three modes, a normal reproduction mode, a fast-forward reproduction mode, and a slow reproduction mode. When the reproduction mode is the normal reproduction mode, the reproduction-speed-controlling section 256 reproduces the streaming data stored in the buffer 255 so that it can be reproduced along real time. When the reproduction mode is the fast-forward reproduction mode, the reproduction-speed-controlling section 256 reproduces the streaming data stored in the buffer 255 so that it can be reproduced for a shorter period of time than the real time. In other words, the reproduction-speed-controlling section 256 reproduces the streaming data stored in the buffer 255 so that it can be fast-forward reproduced. When the reproduction mode is the slow reproduction mode, the reproduction-speed-controlling section 256 reproduces the streaming data stored in the buffer 255 so that it can be reproduced for a longer period of time than the real time. In other words, the reproduction-speed-controlling section 256 reproduces the streaming data stored in the buffer 255 so that it can be slowly reproduced.

Thus, when the reproduction mode is the slow reproduction mode, the reproduction-speed-controlling section 256 reproduces the streaming data stored in the buffer 255 so that it can be reproduced for a longer period of time than a period of normal reproduction time. In accordance with image data in the streaming data, by adjusting an interval time during when an image is updated to make an interval longer, the slow reproduction mode can be realized.

In accordance with audio data in the streaming data, the audio can be seemed to be suspended by, for example, increasing numbers of sampling. In other words, when successively reproducing such the audio frames that are seemed to be suspended, the audio slow reproduction mode can be also realized.

This enables the audio to be reproduced without any occurrence of a break in the audio even when the slow reproduction is performed. If increasing the numbers of sampling, audio frequency falls, but by adjusting an extent of the slow reproduction adequately, it is possible to reproduce the audio without giving any uncomfortable feeling to a user. Herein, the extent of the slow reproduction may be set to a fixed value, for example, 105% or alter consecutively or gradually within a predetermined range, for example, from 100% to 120%, based on an amount of the streaming data stored in the buffer 255. It is to be noted that the above-mentioned 105% mean that a period of reproduction time thereof extends at 5% as compared with a period of the normally standard reproduction time.

Although the reproduction mode that contains "the normal reproduction mode", "the fast-forward reproduction mode", and "the slow reproduction mode" will be described in this embodiment as examples, the reproduction mode can contain any other reproduction modes.

The reproduction section 257 reproduces the streaming data received from the reproduction-speed-controlling section 256 and supplies the output section 116 with the reproduced streaming data.

The output section 116, which corresponds to the output section 157 shown in FIG. 9, is constituted of a display such as LCD a speaker and the like. The output section 116 displays an image based on the streaming data received from the reproduction section 257 and sounds the audio corresponding to the image.

The operation section 115, which corresponds to the input section 156 shown in FIG. 9, supplies the control section 251 with an operation signal corresponding to a predetermined operation by a user. It is to be noted that the predetermined operation is of switching of channels, operation of trick play or the like.

The control section 251 supplies the sending portion 252a with a request for switching operation based on the operation signal from the control section 115. The sending portion 252a receives the request for switching operation from the control section 251 and supplies the server 111 with the request for switching operation through the network 113.

The following will describe operations of the server 111 and the client 114, which constitute the data-streaming system 101.

First, the streaming-data-sending processing by the server 111 will be described with reference to the block diagram shown in FIG. 10 and a flowchart shown in FIG. 12.

At step S11, the control section 211 determines whether or not a request for starting the streaming is received from the client 114 through the network 113.

If, at the step S11, it is determined that the request for starting the streaming has not been received from the client 114, the processing returns to the step S11 and the above-mentioned processing is then repeated. In other words, the processing at the step S11 is repeated until a user operates the client 114 to allow the server 111 to receive the streaming data and, at the step S11, it is determined that the request for starting the streaming is received.

If, at the step S11, it is determined that the request for starting the streaming is received from the client 114, at step S12, the input section 213 reads image and audio signals out of the sources of image and audio 112 and supplies the encoder 214 with these image and audio signals.

At step S13, the encoder 214 receives the image and audio signals from the input section 213 and encodes the image and audio signals according to a predetermined code scheme such as MPEG4. The encoder 214 then supplies the packetizer 215 with the streaming data on the image and audio signals obtained by the encoding.

Now, the streaming data that is sent from the server 111 contains plural frames each constituting one image. The streaming data enables a motion image to be represented by displaying these plural frames successively.

It is possible to set how many frames are displayed for a period of one second based on properties of equipment and an application program to be used and the like. For example, by increasing a frame rate indicating numbers of frames that can be displayed for a period of one second, displayed image quality can be smooth while by decreasing the frame rate, displayed image quality can be rough so that any frame may be neglected. For example, the frame rate can be set to 30 frames per second. In other words, each frame can be displayed for each one thirtieth second at this moment.

Further, the displayed image quality can alter by setting how much amount of data flowing for a period of one second. For example, by increasing bit rate indicating an amount of data flowing for a period of one second, it is possible to display an image with high image quality while by decreasing the bit rate, it is possible to deteriorate the image quality. In other words, the bite rate and the displayed image quality have a trade-off relationship so that by increasing the bit rate, the amount of data can be increased while by decreasing the bit rate, the amount of data can be decreased.

These frames are not independent to each other but they are compressed or extended in units of group of picture (GOP) unit. GOP is constituted by intra picture (I) frame, predictive picture (P) frame, and bidirectionally predictive picture (B) frame.

The I frame has information by which one picture can be completely constituted and is a reference frame in the GOP. The I frames are subject to only an intra-frame compression, which makes its compression ratio smaller and remains a much amount of data.

The P frame has only information on difference from an earlier frame and is dependent on the earlier frame. The P frames are subject to prediction along only a time axis direction to use interframe compression based on the difference from the I frame, in addition to the intra-frame compression. This enables the compression ratio of the P frame to be increased as compared with that of the I frame and decreases its amount of data.

The B frame has information on difference from an earlier frame and a later frame and is dependent on the earlier and later frames. The B frames are subject to bidirectional prediction to use bidirectionally predictive compression utilizing the difference from each of the earlier and later frames, in addition to the intra-frame compression. This enables the compression ratio of the B frame to be further increased as compared with that of the I frame.

Namely, the P frame and the B frame do not reproduce the image independently and to reproduce an image from each of the frames, a sequence (a queue) of the frames is indispensable.

Figure 13:
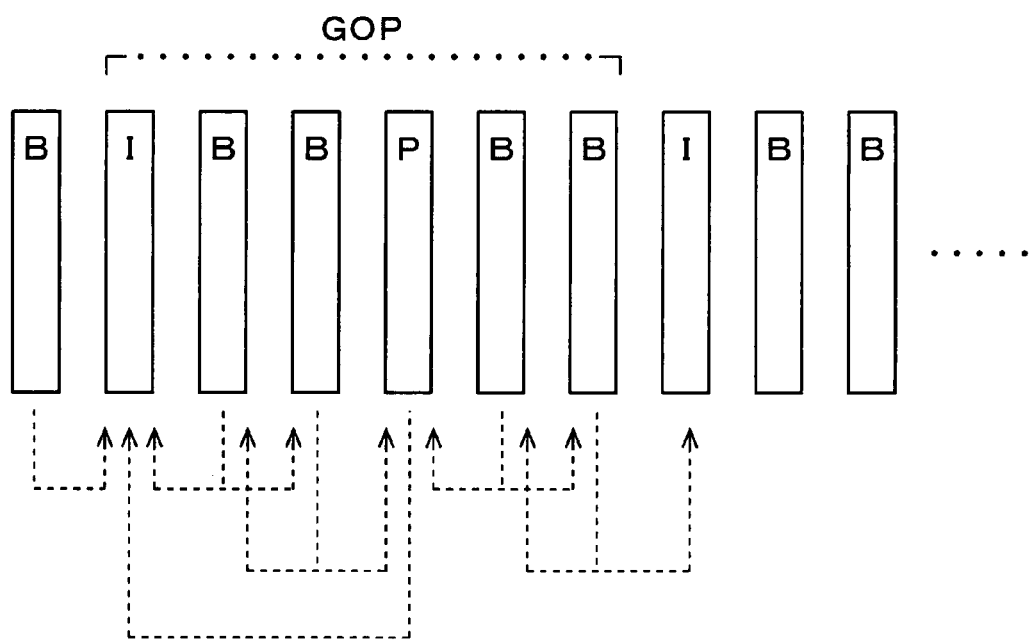
FIG. 13 is a diagram for illustrating frames.

FIG. 13 illustrates details of the frames. In FIG. 13, squares indicate the frames and letters, I, P, and B attached to the respective frames indicate that these frames are I frames, P frames, and B frames, respectively. Suppose that time elapses from a left end to a right end in FIG. 13.

In FIG. 13, GOP is constituted of six frames, I frame, B frame, B frame, P frame, B frame, and B frame.

In the GOP, a first I frame has information by which one picture can be completely constituted so that the first I frame is independent from any other frames. A second B frame following the first I frame is dependent on an earlier frame and a later frame so that it is dependent on the earlier B frame and the later I frame as shown in FIG. 13 by dotted lines. A third B frame following the second B frame is similarly dependent on the earlier P frame and the later B frame as shown in FIG. 13 by dotted lines.

A fourth P frame following the third B frame is dependent on a later frame so that it is dependent on the I frame as shown in FIG. 13 by dotted lines. A fifth B frame following the fourth P frame is dependent on the earlier B frame and the later P frame as shown in FIG. 13 by dotted lines. A sixth B frame following the fifth B frame is dependent on the earlier I frame and the later B frame as shown in FIG. 13 by dotted lines.

The encoder 214 supplies the packetizer 215 with the streaming data that is constituted of the frames as shown in FIG. 13.

Figure 12:
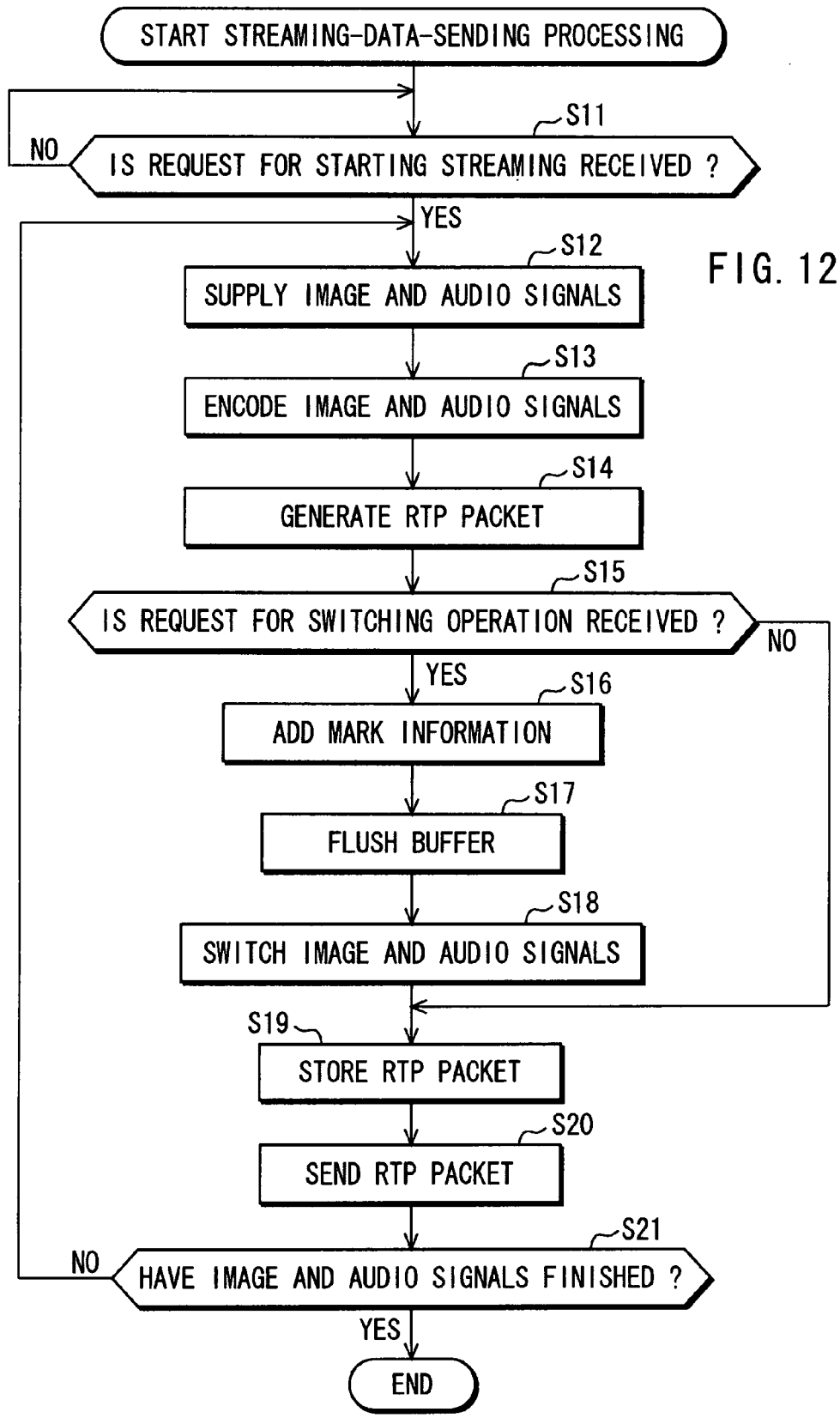
FIG. 12 is a flowchart for explaining streaming-data-sending processing.

Referring back to the flowchart shown in FIG. 12, at step S14, the packetizer 215 receives the streaming data from the encoder 214 and contains the streaming data in a packet with RTP scheme to generate an RTP packet.

At step S15, the control section 211 monitors a state in the receiving portion 212b to determine whether or not a request for switching operation is received from the client 114 through the network 113.

If the request for switching operation has not been received from the client 114 at the step S15, the process skips steps S16 through S18 to go to step S19 where the buffer 216 receives the RTP packet from the packetizer 215 and stores the RTP packet therein. This enables the RTP packet, which has been generated in the packetizer 215 and is to be sent to the client 114, to be stored in the buffer 216.

At step S20, the sending portion 212a receives and sends the RTP packet stored in the buffer 216 to the client 114 through the network 113. This enables the server 111 to send the streaming data to the client 114 through the network 113 based on the request for starting the streaming received from the client 114.

At step S21, the control section 211 monitors a state in the input portion 213 to determine whether or not the image and audio signals from the sources of image and audio 112, which are read by the input section 213, have been completed.

If it is determined at the step S21 that the image and audio signals from the sources of image and audio 112 have been not completed, the processing returns to the step S12 and the above-mentioned processing repeats.

In other words, at the steps S12 through S21, the server 111 encodes the image and audio signals that are received from the sources of image and audio 112 and generates the RTP packet from the encoded image and audio signals. The server 111 then stores the generated RTP packet in the buffer 216 and simultaneously sends the stored RTP packet to the clients 114 through the network 113. This enables the streaming data to be sent to the clients 114 from the server 111 through the network 113. Steps S16 through S18 will be described later.

If the user then operates the operation section 115 in the client 114 as shown in FIG. 11 to switch the channel of the streaming data to be received by the client 114 to another channel and it is determined at the step S15 that the request for switching the operation is received from the client 114, then the mark-information-adding section 217 adds mark information to the RTP packet generated by the packetizer 215 based on the request for switching the operation received from the receiving portion 212b.

Figure 14:
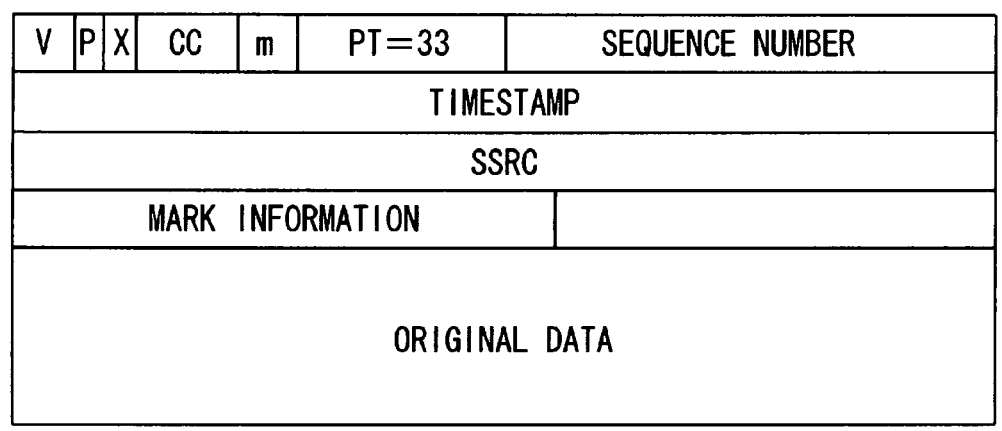
FIG. 14 is a diagram for illustrating an RTP packet.

FIG. 14 illustrates the RTP packet. A top of the RTP packet contains version information with two bits, which is indicated as "V" in FIG. 14. The version information relates to a version of RTP packet.

Padding with one bit, which is indicated as "P" in FIG. 14, follows the version information. Extension information with one bit, which is indicated as "X" in FIG. 14, follows the padding. The extension information indicates whether or not an extension header is present and if the RTP packet contains the extension header, its value is set to a predetermined one.

In the RTP packet, contributing source (CSRC) count, which is indicated as "CC" in FIG. 14, follows the extension information. The CSRC count indicates numbers of CSRC identifier.

Marker information with one bit, which is indicated as "m" in FIG. 14, following the CSRC count is defined by profiles.

Payload type with 7 bits following the marker information is information that defines a format of the RTP packet. In the RTP packet shown in FIG. 14, the payload type (PT) is set as 33.

Sequence number following the payload type is information with 16 bits. The sequence number indicates a reproduction order of the RTP packets and is incremented for every sending. The sequence number is used for detecting any packet loss and restoring the reproduction order of the RTP packets.

Timestamp with 32 bits following the sequence number is information in which a top octet of the streaming data stored in the RTP packet indicates sampling time thereof. Processing time is controlled based on the timestamp when the RTP packet is expanded so that reproduction of a real time image or audio can be controlled. Common timestamp is set to the RTP packets containing the streaming data of the same frame.

Synchronization source (SSRC) identifier following the timestamp is information with 32 bits indicating source of the streaming data contained in the RTP packet.

Mark information follows the SSRC identifier in the RTP packet. The mark information is indicated as "MARK INFORMATION" in FIG. 14. The mark information relates to such information that a user manipulating the client 114 has completed a predetermined operation, in which, for example, the sequence numbers are set within a predetermined range constituted of 1 through 65535. For example, the mark-information-adding section 217 increments by one the sequence number of the mark information that is contained in the RTP packet and adds the incremented sequence number as the mark information to the RTP packet.

Streaming data follows the mark information in the RTP packet. The streaming data is indicated as "Original Data" in FIG. 14.

The RTP packet is an example of packet containing the streaming data to be sent to the clients 114. Although the RTP has been used as a protocol to send the streaming data in this embodiment, other protocol such as real time streaming protocol (RTSP) or session description protocol (SDP) may be also used.

Referring back to the flowchart sown in FIG. 12, at step S17, the RTP packet(s) stored in the buffer 216 is (are) flushed. This enables all of the RTP packet(s) stored in the buffer 216 to be destroyed.

It is to be noted that only specified data, not all of the RTP packet(s) stored in the buffer 216, may be flushed. For example, in the buffer 216, as the specified data, only I frame that is not dependent on an earlier frame and a later frame remains but data other than the I frame is flushed. This enables the user operating the client 114 to view and hear the streaming data without feeling any temporal interruption thereof by utilizing data, which remains in the buffer 216, for being suitable for reproducing the image.

If the buffer 216 contains plural I frames, all of the I frames may remain or only a newest I frame may remains. If only the newest I frame remains, when the buffer 216 stores the streaming data, another buffer, not shown, in the server 111 stores the newest I frame of the I frames stored in the buffer 216. The buffer 216 then stores the newest I frame stored in another buffer after all of the data stored in the buffer 216 have been flushed. This enables the buffer 216 to store only the newest I frame.

At step S18, the input section 213 switches image and audio signals to be read thereby under the control of the control section 211. Specifically, if a channel of the streaming data to be received by the client 114 is changed to another channel, the input section 213 reads image and audio signals of another channel.

At step S19, the buffer 216 stores the RTP packet received from the packetizer 215. This enables only the RTP packet to which the mark information is added by the mark-information-adding section 217 to be stored in the buffer 216. A frame generated based on the RTP packet to which the mark information is added is sent to the client 114 through the network 113 at the highest speed.

At step S20, the sending portion 212a sends the RTP packet stored in the buffer 216 to the client 114 through the network 113. At step S21, processing at the above-mentioned steps S12 through S21 repeats until it is determined that the image and audio signals from the sources of image and audio 112, which are read by the input section 213, have been completed.

In other words, the buffer 216 stores the RTP packet containing the streaming data of another channel changed by the user after the RTP packet to which the mark information is added and the sending portion 212a sends the stored RTP packet to the clients 114 through the network 113.

If the image and audio signals from the sources of image and audio 112, which are read out of the input section 213, have been completed and it is determined at the step S21 that the image and audio signals from the sources of image and audio 112 have been completed, the streaming-data-sending processing by the server 111 ends.

Thus, the server 111 sends the streaming data to each of the clients 114 through the network 113.

Figure 15:
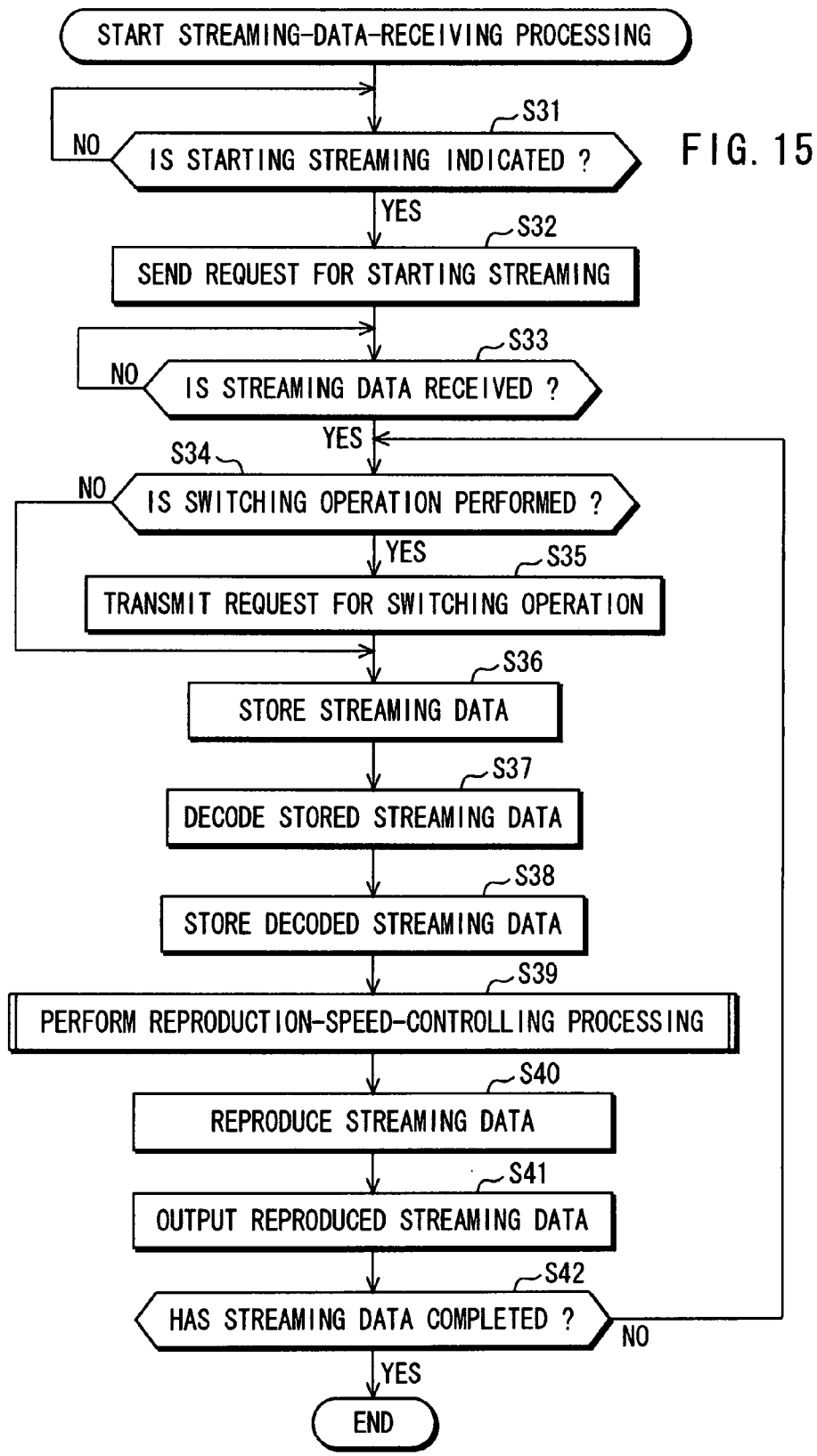
FIG. 15 is a flowchart for explaining streaming-data-receiving processing by the client shown in FIG. 11.

The following will describe streaming-data-receiving processing by the client 114 shown in FIG. 11 with reference to the block diagram shown in FIG. 11 and the flowchart shown in FIG. 15.

At step S31, the control section 251 determines whether or not a user requests the client 114 to start the streaming based on an operation signal from the operation section 115.

If it is determined at step S31 that the user does not request the client 114 to start the streaming, the processing repeats at the step S31. In other words, the processing at the step S31 repeats until the user requests the client 114 to start the streaming by his or her operation of the operation section 115 and it is then determined at the step S31 that he or she requests the client 114 to start the streaming.

If it is determined at step S31 that the user requests the client 114 to start the streaming, the sending portion 252a sends the request for starting the streaming to the server 111 through the network 113 under the control of the control section 251 at step S32.

At step S33, the control section 251 monitors a state of the communication section 252 to determine whether or not the streaming data is received from the server 111 through the network 113 based on the request for starting the streaming.

If it is determined at the step S33 that the streaming data is not received from the server 111, the above-mentioned processing repeats at the step S33. In other words, the processing at the step S33 repeats until the server 111 sends the streaming data through the network 113 and it is then determined at the step S33 that the streaming data is received from the server 111.

On the other hand, it is then determined at the step S33 that the streaming data is received, the control section 115 determines at step S34 whether or not the user performs any switching operation such as channel changes, namely, he or she performs the above-mentioned predetermined operation, based on the operation signal received from the operation section 115.

If it is determined at the step S34 that the user performs any switching operation, the sending portion 252a sends the request for switching the operation to the server 111 through the network 113 at step S35 under the control of the control section 251 based on the operation signal from the operation section 115. This enables the client 114 to inform the server 111 that the user has performed a predetermined operation.

On the other hand, if it is determined at the step S34 that the user does not perform any switching operation, the processing at the step S35 is skipped and the processing goes to step S36 where the buffer 253 stores the streaming data, which is received from the server 111 through the network 113 and supplied from the receiving portion 252b.

At step S37, the decoder 254 reads the streaming data stored in the buffer 253 at time when the decoder 254 performs any processing and decodes the read streaming data with a predetermined decode scheme. The decoder 254 supplies the buffer 255 with the streaming data thus decoded and the buffer 255 stores the decoded streaming data therein.

At step S38, the buffer 255 receives the decoded streaming data from the decoder 254 and stores it. It is to be noted that since the buffer 255 is a memory of FIFO type, items of the streaming data stored in the buffer 255 are supplied to the reproduction-speed-controlling section 256 in queue order so the first stored item goes out the first.

At step S39, the reproduction-speed-controlling section 256 performs any reproduction-speed-controlling processing. Specifically, the reproduction-speed-controlling section 256 controls the reproduction speed of the streaming data stored in the buffer 255 so that the streaming data can be reproduced at the reproduction speeds corresponding to the normal reproduction mode, the fast-forward reproduction mode, and the slow reproduction mode.

Figure 16:
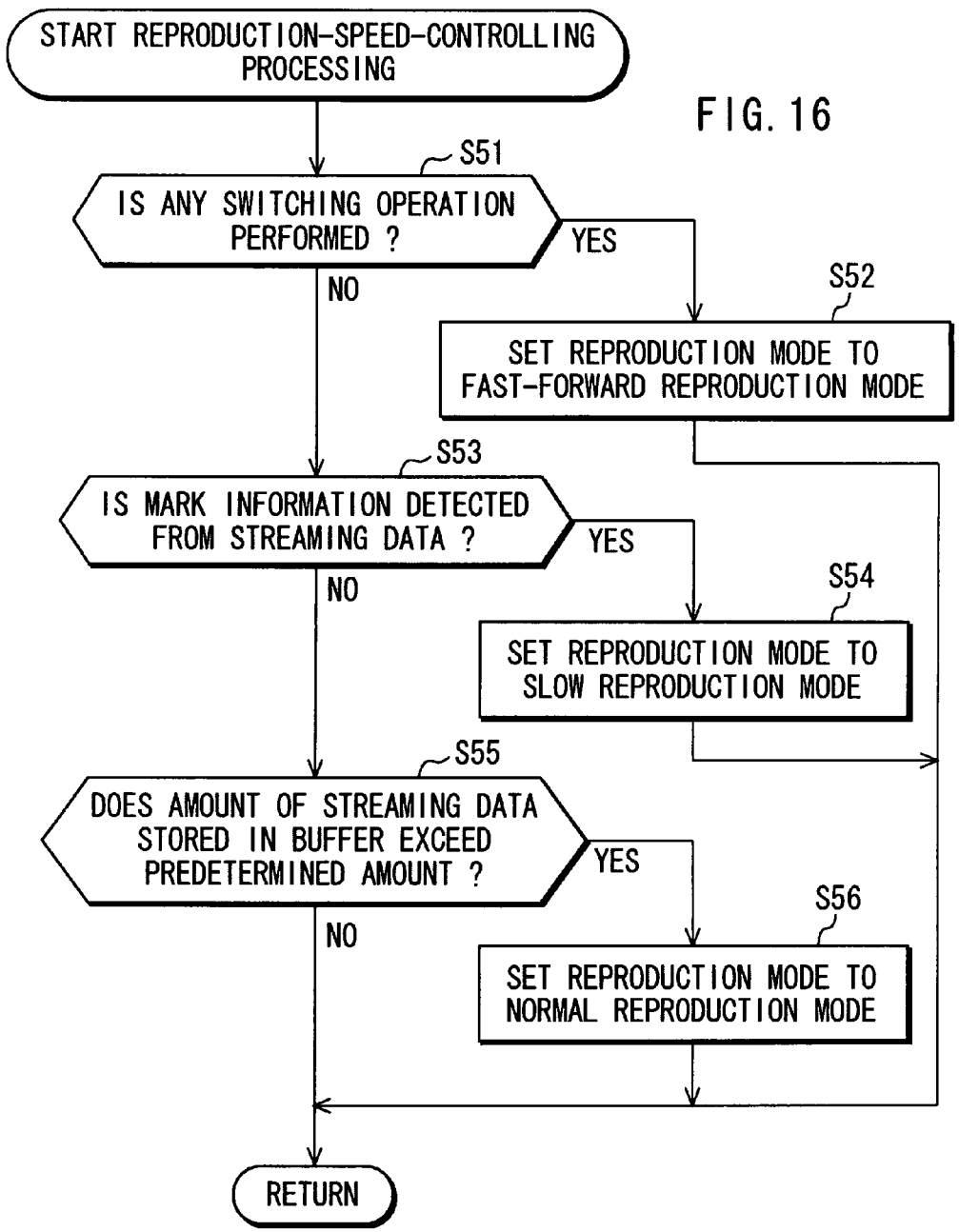
FIG. 16 is a flowchart for explaining reproduction-speed-controlling processing by a reproduction speed control section shown in FIG. 11.

Herein, the following will describe details of the reproduction-speed-controlling processing by the reproduction-speed-controlling section 256 shown in FIG. 11, which corresponds to the processing in the step S39, with reference to a flowchart shown in FIG. 16.

At step S51, the reproduction-speed-controlling section 256 determines whether or not a user performs any switching operation such as change of channels, namely, any predetermined operation, under the control of the control section 251 based on the operation signal from the operation section 115.

If it is determined at the step S51 that the user performs the predetermined operation, the reproduction-speed-controlling section 256 sets its reproduction mode as a fast-forward reproduction mode. Specifically, the reproduction-speed-controlling section 256 selects a top frame 1, for example, from the frames 1 through 13 stored in the buffer 255 and the reproduction-speed-controlling section 256 then selects the frames on every fourth frame, a frame 5, a frame 9, and a frame 13. The reproduction-speed-controlling section 256 supplies the reproduction section 257 with the selected frames 1, 5, 9, and 13.

In other words, since the reproduction-speed-controlling section 256 selects only the frames 1, 5, 9, and 13 from the frames 1 through 13 stored in the buffer 255, it controls the streaming data stored in the buffer 255 so as to be fast-forwarded.

Accordingly, if the user performs any switching operation, a reproduction speed of the streaming data stored in the buffer 255 can be changed to fast-forward, so that the client 114 can reproduce the streaming data that has been switched, promptly after receiving the streaming data from the server 111.

Thus, when the server 111 sends the streaming data through the network 113, it is possible to view an image and hear the audio on the streaming data stably by using the buffer 255. When a user performs any operation on the image and audio signals from the sources of image and audio 112, it is possible to view an image and hear the audio based on the user's operation with any very small delay. This enables to be improved a response when the user performs any switching operation, thereby improving an operation property thereof.

Any delay accompanied by the switching operation shortens by fast-forward reproduction, not by flushing the streaming data stored in the buffer 255, so that the user can view images and hear audios before and after the user's switching operation consecutively without any rupture in terms of time. This allows a user to grasp contents that precede and follow one another with clarification, thereby improving an operation property such as fast-forward, reverse or the like of the image and audio signals from the sources of image and audio 112.

Figure 17:
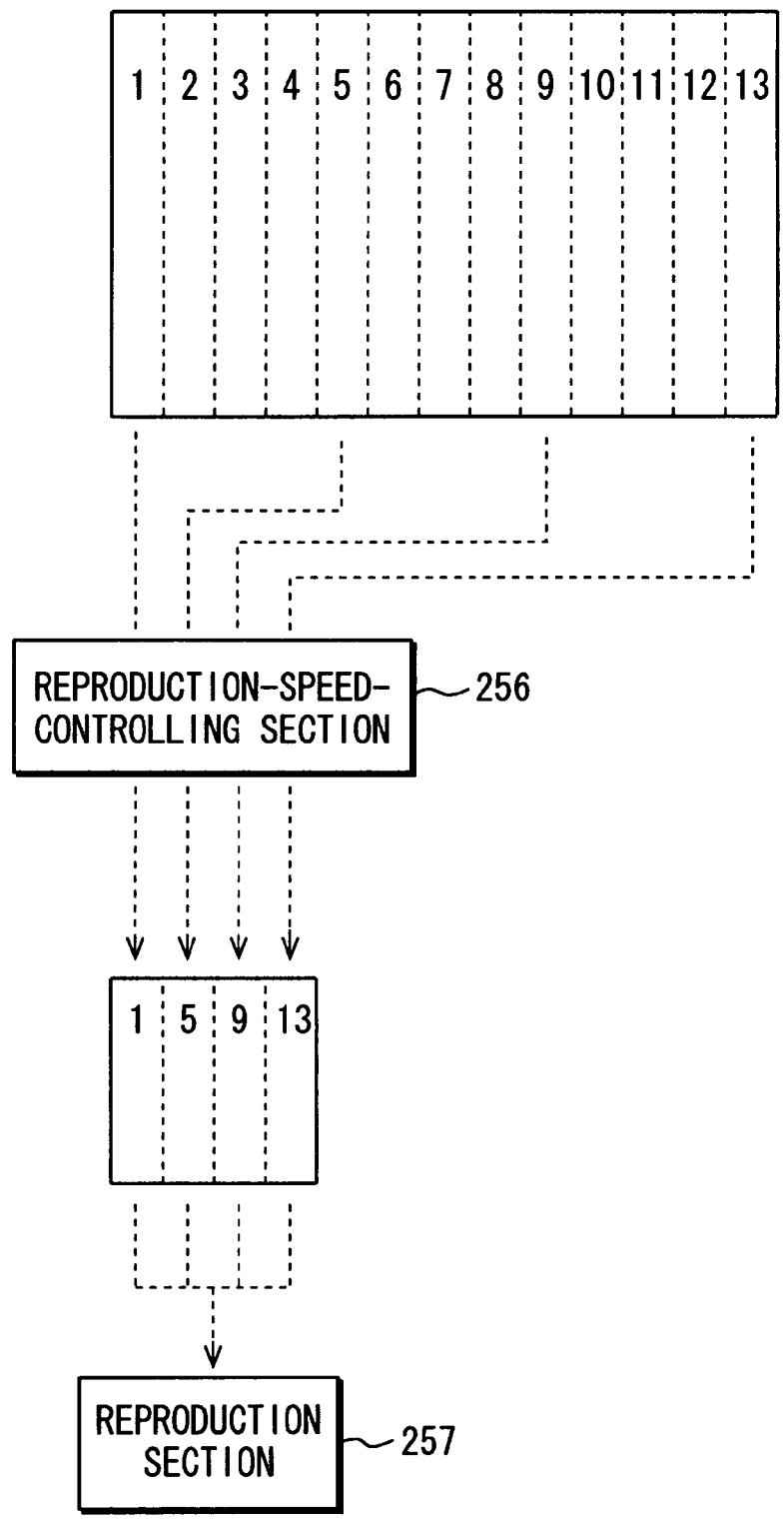
FIG. 17 is a diagram for showing a fast-forward reproduction mode.

It is to be noted that although the reproduction-speed-controlling section 256 has selected only the frames 1, 5, 9, and 13 from the frames 1 through 13 stored in the buffer 255 on an example shown in FIG. 17, it is not limited thereto. For example, the reproduction-speed-controlling section 256 can select only I frames contained in the streaming data stored in the buffer 255 or can select any desired frames by making a clock cycle inside the system shorter and comparing time indicated by the shortened clock cycle with the timestamp in each of the frames.

On the other hand, if it is determined at the step S51 that the user has not performed the predetermined operation, the reproduction-speed-controlling section 256 determines whether any mark information is detected from the streaming data stored in a top position (reproduction position) of the buffer 255 at step S53.

In other words, as described above, when the server 111 receives a request for switching operation, the mark information is added to the RTP packet so that the mark information is added to a top of the RTP packet containing the streaming data after the user performs the switching operation, thereby allowing the client 114 to acknowledge receiving the streaming data after the user performs the switching operation by determining whether or not the mark information is detected.

Figure 18:
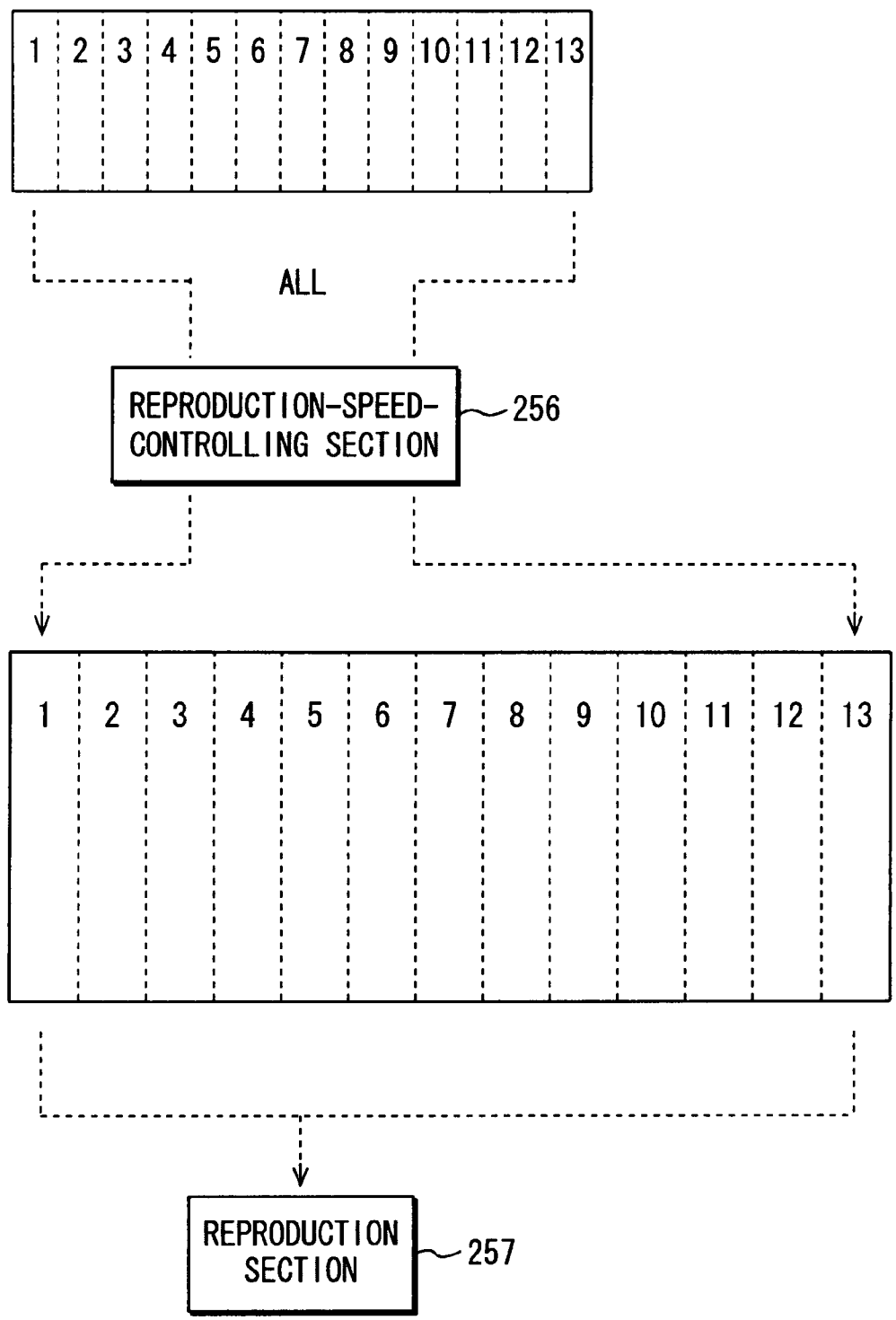
FIG. 18 is a diagram for showing a slow reproduction mode.
Figure 19:
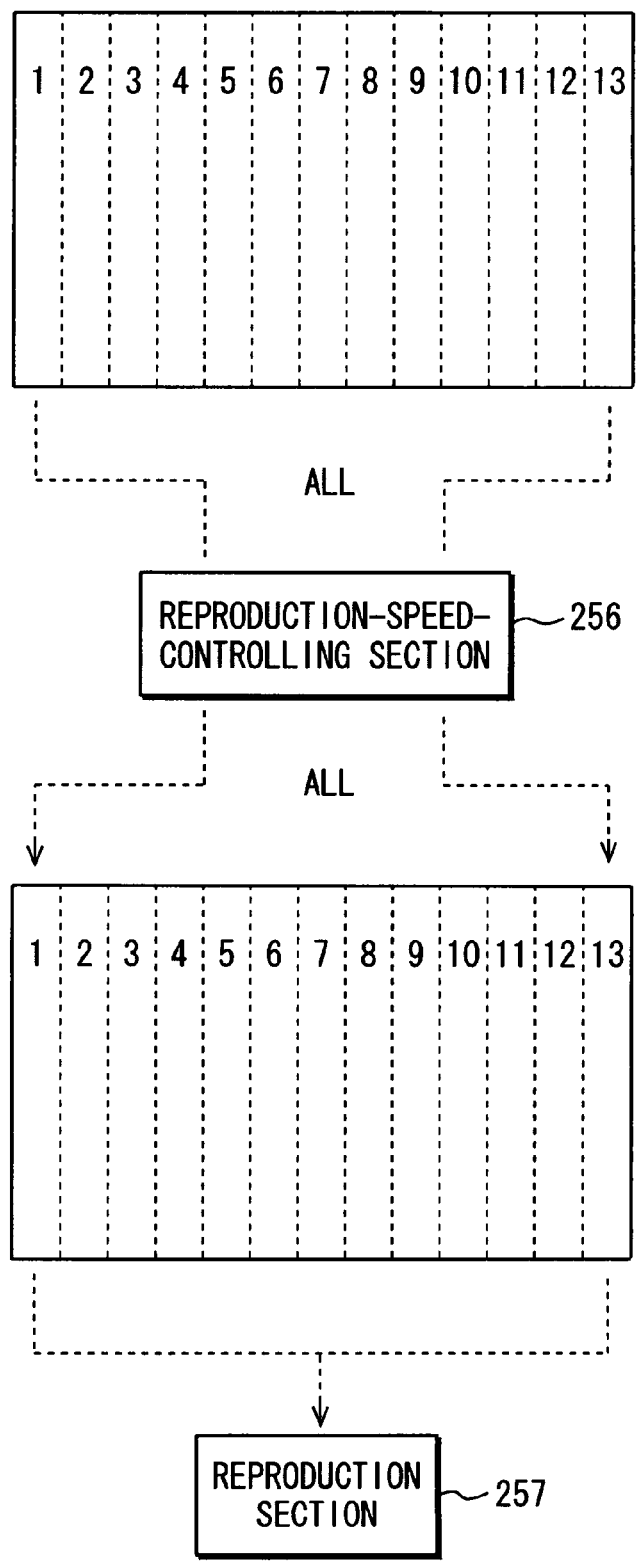
FIG. 19 is a diagram for showing a normal reproduction mode.

If it is determined at the step S53 that the mark information is detected from the streaming data, the reproduction-speed-controlling section 256 sets the reproduction mode to the slow reproduction mode. Specifically, the reproduction-speed-controlling section 256 reproduces all the frames 1 through 13, for example, stored in the buffer 255 as shown in FIG. 18. In this moment, the reproduction-speed-controlling section 256 performs any change processing on the streaming data so that a period of reproduction time of each of the frames can be made longer than a period of normal reproduction time thereof before the frames are supplied to the reproduction section 257, and supplies it to the reproduction section 257 where the changed streaming data is reproduced.

This change processing relates to making each frame length longer by, for example, two folds in a case of video frame, thereby implementing a slow reproduction. This change processing also relates to increasing numbers of sampling contained in an audio frame in a case of the audio frame to generate a longer audio frame and supply the reproduction section 257 with the generated audio frame. For example, the reproduction-speed-controlling section 256 generates five audio frames when a longer audio frame by 5% of the audio frames containing 100 items of sampling is generated and adds the generated audio frames to original audio frames. How to generate these five audio frames is realized by, for example, calculating an average of sampling values in front and behind or using any typical interpolation such as a linear interpolation, a spline interpolation, and a Bezier interpolation.

On the other hand, it is determined at the step S53 that the mark information is not detected from the streaming data, the reproduction-speed-controlling section 256 determines whether or not an amount of the streaming data in the buffer 255 exceeds a predetermined amount at step S55.

If it is determined at the step S55 that the amount of the streaming data stored in the buffer 255 does not exceed the predetermined amount, the processing returns to step S39 or later in the flowchart shown in FIG. 15 where their steps are carried out. It is to be noted that steps S40 through S42 will be described later.

Thus, when the user operates the client 114 to perform any switching operation, the reproduction-speed-controlling section 256 changes the reproduction mode of the streaming data stored in the buffer 255 to the fast-forward reproduction mode so that the streaming data can be reproduced for a shorter period of time than a period of real time. When the mark information is detected from the streaming data stored in the buffer 255, the streaming data following this detection is the changed streaming data, which indicates that the streaming data to be fast-forwarded is completely reproduced. Accordingly, the reproduction-speed-controlling section 256 changes its reproduction mode from the fast-forward reproduction mode to the slow reproduction mode, so that an amount of the streaming data to be stored in the buffer 255 is increased.

In other words, when changing the reproduction mode to the fast-forward reproduction mode, the streaming data stored in the buffer 255 is reproduced for a period of shorter time than a period of real reproduction time, so that an amount of the streaming data stored in the buffer 255 can be very short thereof. The reproduction-speed-controlling section 256 thus changes its reproduction mode from the fast-forward reproduction mode to the slow reproduction mode in order to increase an amount of the streaming data to be stored in the buffer 255. At the buffer 255, data stored therein is increased as compared with data read therefrom. This enables an amount of the streaming data to be stored to be increased in the buffer 255 step by step without any stop of the reproduction of the streaming data by the reproduction section 257.

If it is checked that an amount of the streaming data in the buffer 255 exceeds a predetermined amount, the reproduction-speed-controlling section 256 determines that a sufficient amount of the streaming data received from the server 111 through the network 113 can be kept. In this moment, the reproduction-speed-controlling section 256 changes the reproduction mode from the slow reproduction mode to the normal reproduction mode because further amount of the streaming data received from the server 111 is unnecessarily kept. This causes an amount of the streaming data to be added to the buffer 255, in the reproduction of normal reproduction mode, to be made identical to an amount of the streaming data read out of the buffer 255. The reproduction section 257 can reproduce items of the streaming data successively with a certain amount of the streaming data stored in the buffer 255 being kept.

It is to be noted that the reproduction-speed-controlling section 256 detects an amount of the streaming data stored in the buffer 255 by calculating difference between a timestamp of the streaming data of the newest position in the buffer 255 and a timestamp of the streaming data of the reproduction position therein.

The reproduction-speed-controlling section 256 may change the reproduction modes successively based on an amount of the streaming data stored in the buffer 255, not whether or not an amount of the streaming data stored in the buffer 255 exceeds a predetermined value. Specifically, the reproduction-speed-controlling section 256 changes the reproduction mode to the slow reproduction mode when an amount of the streaming data stored in the buffer 255 is less than a predetermined value. In this moment, the reproduction-speed-controlling section 256 can adjusts an amount of the streaming data stored in the buffer 255. For example, the reproduction-speed-controlling section 256 changes the reproduction mode to a slower reproduction mode when the streaming data stored in the buffer 255 is reproduced at a slower speed if the streaming data stored in the buffer 255 falls much below the predetermined value. The reproductionspeed-controlling section 256 changes the reproduction mode to a little slower reproduction mode when the streaming data stored in the buffer 255 is reproduced at a little slower speed if the streaming data stored in the buffer 255 comes closer to the predetermined value.

Similarly, the reproduction-speed-controlling section 256 can adjust an amount of the streaming data stored in the buffer 255 when an amount of the streaming data stored in the buffer 255 exceeds a predetermined value. Specifically, the reproduction-speed-controlling section 256 changes the reproduction mode to a faster-forward reproduction mode when the streaming data stored in the buffer 255 is reproduced at a faster speed if the streaming data stored in the buffer 255 rises much over the predetermined value. The reproduction-speed-controlling section 256 changes the reproduction mode to a little faster reproduction mode when the streaming data stored in the buffer 255 is reproduced at a little faster speed near the normal reproduction if the streaming data stored in the buffer 255 comes closer to the predetermined value.

Although the reproduction-speed-controlling section 256 has changed the reproduction mode to the fast-forward reproduction mode in the above-mentioned embodiment when a user performs any switching operation, it is not limited thereto. For example, if the mark information is detected from the streaming data stored in the buffer 255, which the server 111 sends last through the network 113, the reproduction-speed-controlling section 256 may change the reproduction mode to the fast-forward reproduction mode.

Referring back to the flowchart shown in FIG. 15, at step S40, the reproduction section 257 reproduces the streaming data stored in the buffer 255, which is received from the reproduction-speed-controlling section 256, and supplies the output section 116 with the reproduced streaming data.

At step S41, the output section 116 receives the streaming data from the reproduction section 257 and outputs the reproduced streaming data to display an image based on this streaming data on a display and sound an audio corresponding to the image.

At step S42, the control section 251 monitors a state in the communication section 252 to determine whether or not the streaming data sent from the server 111 through the network 113 has been completed.

If it is determined at the step S42 that the streaming data has been not completed, the processing returns to the step S34 and the processing of the above-mentioned steps S34 through S42 then repeats.

On the other hand, if it is determined at the step S42 that the streaming data has been completed, the streaming-data-receiving processing by the client 114 shown in FIG. 11 ends.

Thus, the client 114 can receive the streaming data from the server 111 through the network 113.

Accordingly, when the user performs any predetermined operation, the client 114 performs the fast-forward reproduction, not flushes the streaming data stored in the buffer to destroy the streaming data stored in the buffer, so that the streaming data after the user performs the predetermined operation can be reproduced without destroying the streaming data before the user performs the predetermined operation. When the user operates the client 114 to change the reproduction speed in the same contents such as fast-forward reproduction, no rupture in terms of time occur between the streaming data before the user performs the predetermined operation and the streaming data after the user performs the predetermined operation. This enables the user to view the image and hear the audio based on the streaming data without any uncomfortable feelings.

Although the server 111 has added the mark information to the streaming data in the above embodiment, the client 114 may add the mark information to the streaming data. Next, the following will describe operations of the client 114 that adds the mark information to the streaming data. It is to be noted that if the client 114 adds the mark information to the streaming data, all the streaming data stayed in the client 114 is shortened in terms of time to become the streaming data, base on which the user wants to view the image and hear the audio.

Figure 20:
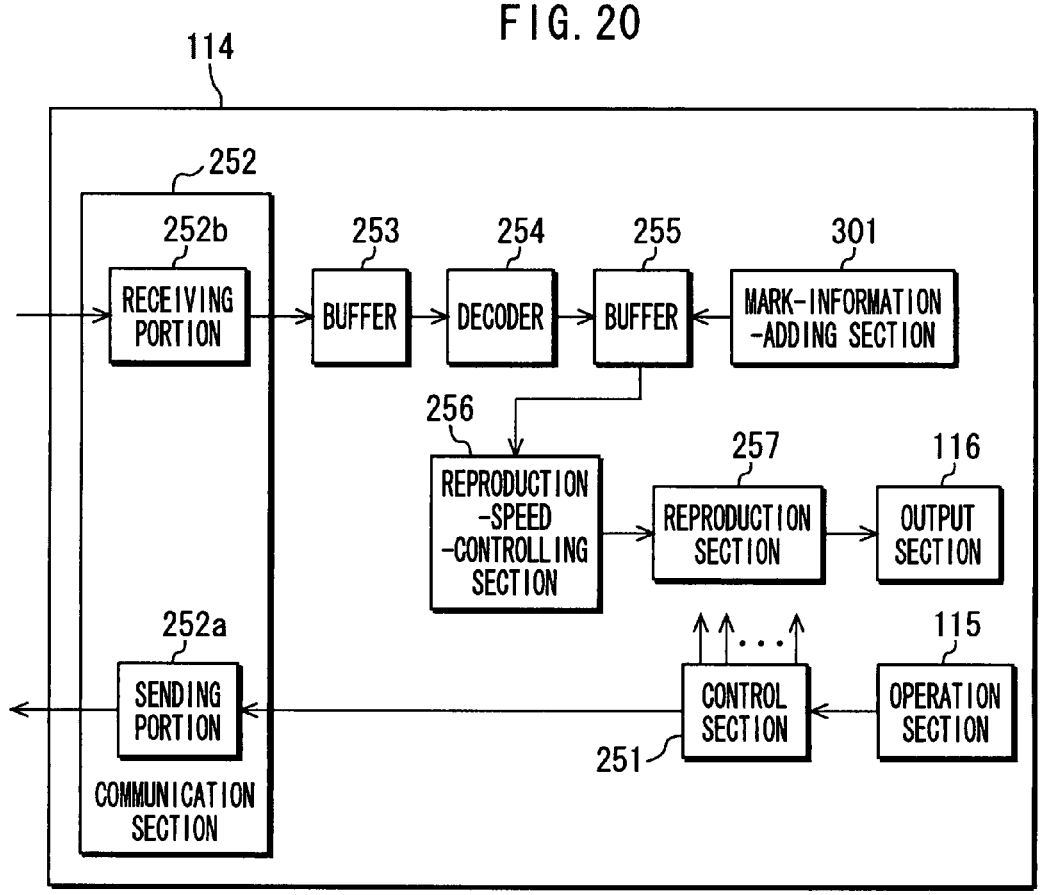
FIG. 20 is a block diagram for showing another functional configuration of a client.

FIG. 20 shows another functional configuration of a client 114. In FIG. 20, like codes are attached to like members shown in FIG. 11, detailed description of which will be omitted because they perform the same processing. Namely, the client 114 shown in FIG. 20 is provided with a mark-information-adding section 301 in addition to the client 114 shown in FIG. 11.

The mark-information-adding section 301 adds the mark information to the streaming data that is receives last from the server 111 through the network 113 among the streaming data stored in the buffer 255 under the control of the control section 251 based on an operation signal from the operation section 115 when the user performs any predetermined operation.

Figure 21:
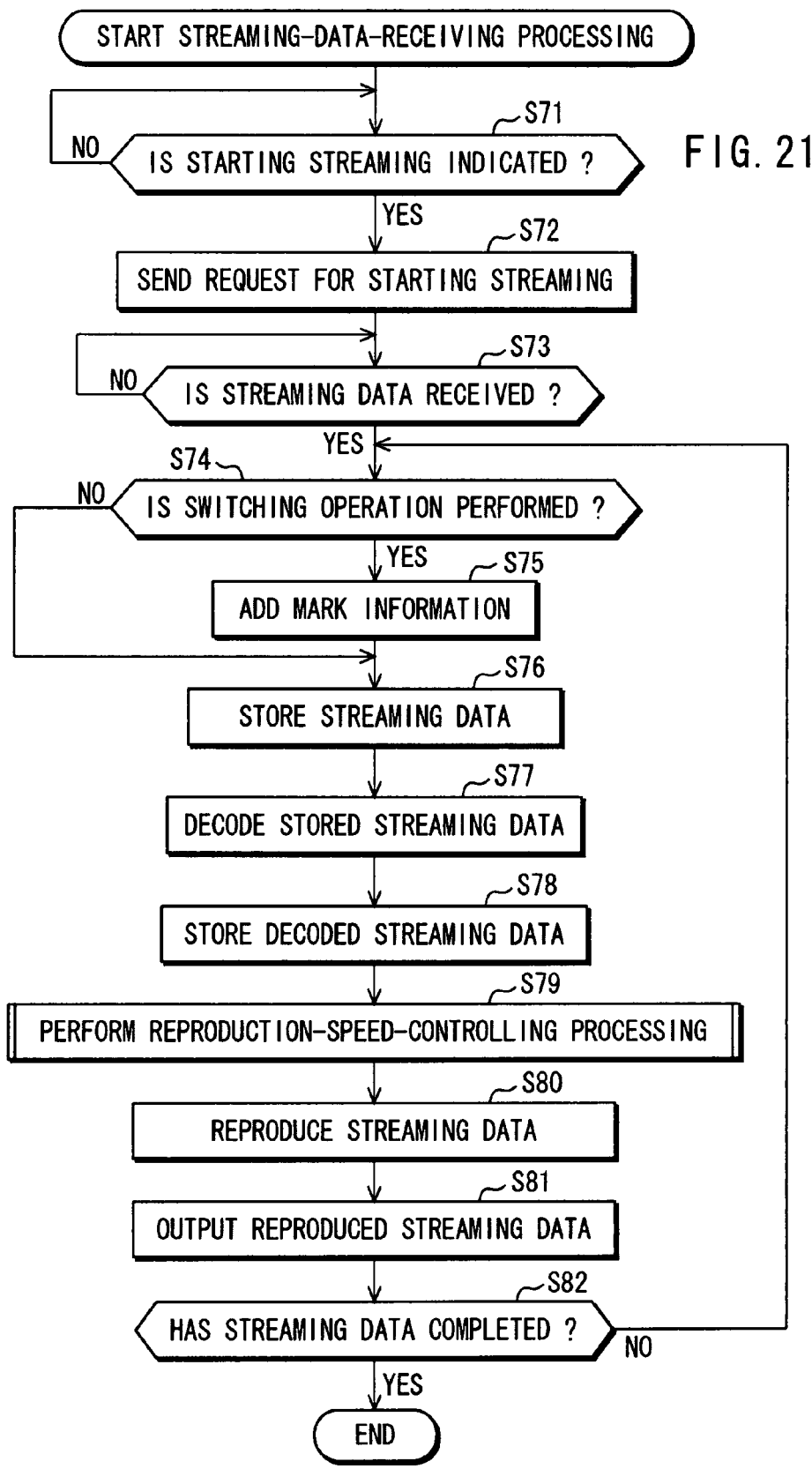
FIG. 21 is a flowchart for explaining streaming-data-receiving processing by the client shown in FIG. 20.

The following will describe the streaming-data-receiving processing by the client 114 shown in FIG. 20 with reference to the block diagram shown in FIG. 20 and a flowchart shown in FIG. 21.

At steps S71 through S73, if a user operates the operation section 115 to start the streaming, the streaming-data-receiving processing starts, similar to the steps S31 through S33 shown in FIG. 15.

At step S74, if it is determined that the user has performed switching operation, the mark-information-adding section 301 adds the mark information to the streaming data that is receives last from the server 111 through the network 113 among the streaming data stored in the buffer 255 at step S75.

In this moment, the sending portion 252a sends a request for switching operation to the server 111 through the network 113 under the control of the control section 251 based on the operation signal from the operation section 115. The server 111, which receives the request for switching operation, sends the streaming data after the operation. In this moment, to this streaming data, any mark information is not added.

In other words, the client 114 receives the streaming data, to which any mark information is not added, from the server 111 through the network 113 when the user has performed the switching operation.

Figure 22:
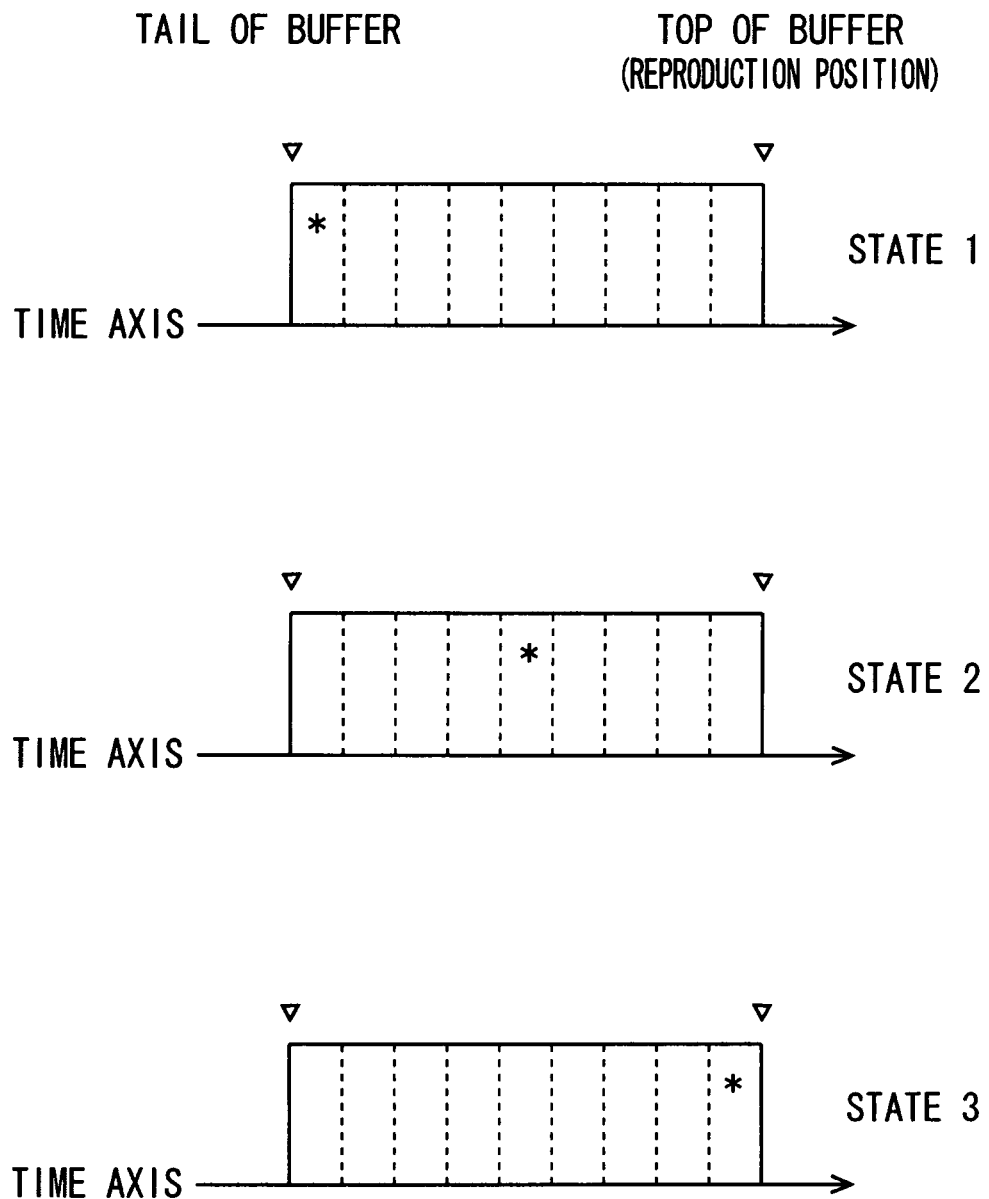
FIG. 22 is a diagram for illustrating items of streaming data stored in the buffer.

FIG. 22 illustrates items of the streaming data stored in the buffer 255.

Three states in the buffer 255 are illustrated in FIG. 22. Supposing that they are arranged as States 1, 2, and 3 from a top thereof to a bottom thereof in FIG. 22, the streaming data stored in the buffer 255 alters in an order of State 1, State 2, and State 3 as the time has been elapsed.

In FIG. 22, the buffer 255 is partitioned by the dotted lines into nine squares, each indicating the streaming data stored in the buffer 255. Time elapses from left side to right side in FIG. 22. In other words, the buffer 255 is a memory of FIFO type such that the oldest stored streaming data is first read out thereof. Among nine squares, a leftmost square indicates the steaming data stored in a tail of the buffer 255. The leftmost square indicates the steaming data last stored in the buffer 255 and a rightmost square indicates the streaming data first stored in the buffer 255. Thus, the rightmost square of the nine squares indicates a top item of the streaming data stored in the buffer 255 so that the reproduction section 257 reproduces the top item of the streaming data.

As shown in State 1 shown in FIG. 22, the mark-information-adding section 301 adds the mark information with an asterisk "*" to the streaming data that is received last from the server 111 through the network 113 among the streaming data stored in the buffer 255 and stored in a tail of the buffer 255. Specifically, the mark-information-adding section 301 adds the mark information to, for example, the RTP packet constituting the streaming data as shown in FIG. 14.

Referring back to the flowchart shown in FIG. 21, at steps S76 through S78, the received streaming data is decoded with it being temporarily stored, similar to the steps S36 through S38 shown in FIG. 15.

At step S79, the reproduction-speed-controlling section 256 performs the reproduction-speed-control processing to control the reproduction speed so that the streaming data stored in the buffer 255 can be reproduced at a desired rate. The reproduction-speed-controlling section 256 supplies the reproduction section 257 with such the streaming data.

The reproduction speed adjustment processing in the reproduction-speed-controlling section 256 shown in FIG. 20 relative to processing at the step S79 is identical to the reproduction speed adjustment processing that has been described with reference to the flowchart shown in FIG. 16, detailed description of which will be omitted. In this case, at the step S53 shown in FIG. 16, the reproduction-speed-controlling section 256 determines whether or not the mark information is detected from the streaming data stored in a top (reproduction position) in the buffer 255. In this moment, the mark information that the reproduction-speed-controlling section 256 detects is mark information to which the mark-information-adding section 301 in the client 114, not the server 111, adds.

In other words, the mark-information-adding section 301 adds the mark information to the streaming data when the user performs the switching operation, so that the mark information is added to a top of the streaming data after the user's operation. This allows the client 114 to acknowledge the streaming data after the user's switching operation by determining whether or not the mark information is detected.

Specifically, at the step S52 shown in FIG. 16, the reproduction-speed-controlling section 256 changes the reproduction mode to fast-forward reproduction mode until the streaming data to which the mark information with an asterisk is added reaches to a top of the buffer 255 as shown in State 2 of FIG. 22. In other words, the reproduction-speed-controlling section 256 changes the reproduction speed of the streaming data stored in the buffer 255 to a fast-forward reproduction when the user performs the switching operation. This allows the client 114 immediately can reproduce the streaming data that has been changed to the fast-forward reproduction after receiving such the streaming data from the server 111.

At the step S54 shown in FIG. 16, the reproduction-speed-controlling section 256 then changes the reproduction mode to slow reproduction mode when the streaming data to which the mark information with an asterisk is added reaches to the top of the buffer 255 as shown in State 3 of FIG. 22. In other words, when the mark information is detected from the streaming data, the streaming data after detection is the streaming data after the user performs switching operation so that all the streaming data to be fast-forwarded can be reproduced. The reproduction-speed-controlling section 256 changes the reproduction mode from the fast-forward reproduction mode to the slow reproduction mode to increase an amount of the streaming data stored in the buffer 255.

At the step S56 shown in FIG. 16, if it is determined that an amount of the streaming data stored in the buffer exceeds a predetermined value, the reproduction-speed-controlling section 256 changes the reproduction mode to the normal reproduction mode because the buffer 255 has already stored the sufficient amount of the streaming data. This enables the reproduction-speed-controlling section 256 to reproduce the streaming data stored in the buffer 255 at a normal reproduction speed.

Referring back to the flowchart shown in FIG. 21, at steps S80 through S82, the streaming data that has been received from the server 111 through the network 113 is reproduced until the streaming data is completed and is output, similar to the steps S40 through S42 shown in FIG. 21.

Thus, since adding the mark information to the streaming data by the client 114 removes cooperation with the server 111, the user can design the client 114 with any high independency.

It is to be noted that when the client 114 adds the mark information thereto, there occurs difference in terms of time between a point of time when the user performs switching operation and a point of time when the mark information is added to the streaming data. Accordingly, if a small delay occurs in the network 113 and the streaming data generated in the server 111 is favorably sent to the client 114 through the network 113, it is possible to obtain an excellent effect identical to that in a case where the server 111 adds the mark information to the streaming data.

Although the above-mentioned embodiment in which by adding the mark information to the streaming data, it is informed that the user performs the switching operation, has been described, it may be informed that the user performs the switching operation by storing a timestamp at a point of time when the user performs the switching operation, in addition to adding the mark information. The following will describe operations of the client 114 if it is informed that the user performs the switching operation by storing the timestamp.

Figure 23:
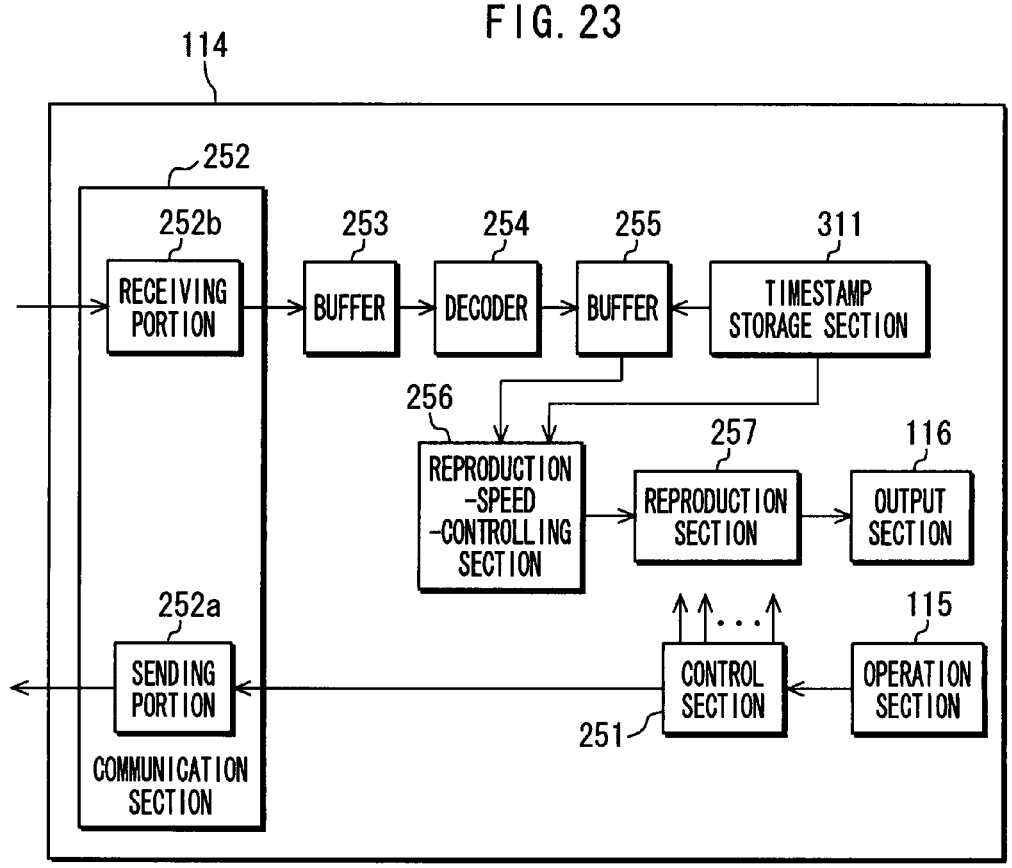
FIG. 23 is a block diagram for showing further functional configuration of a client.

FIG. 23 shows further functional configuration of the client 114.

In FIG. 23, like codes are attached to like members shown in FIG. 11, detailed description of which will be omitted because they perform the same processing. Namely, the client 114 shown in FIG. 23 is provided with a timestamp storage section 311 in addition to the client 114 shown in FIG. 11.

The timestamp storage section 311 stores the timestamp relative to the streaming data that is stored in a tail of the buffer 255 and is received last from the server 111 through the network 113 among the streaming data stored in the buffer 255 under the control of the control section 251 based on the operation signal from the operation section 115 when the user performs any predetermined operation.

Figure 24:
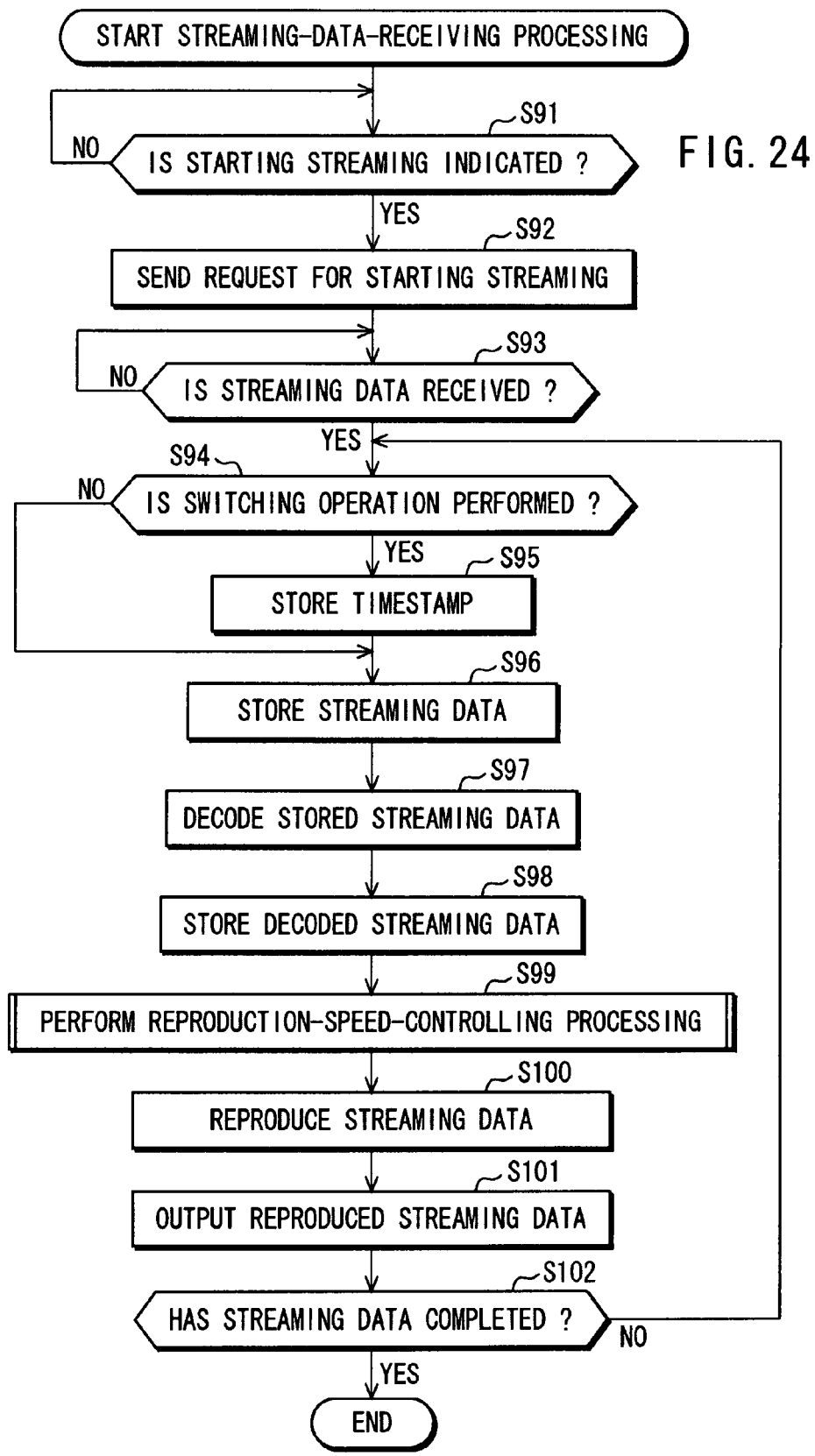
FIG. 24 is a flowchart for explaining streaming-data-receiving processing by the client shown in FIG. 23.

The following will describe streaming-data-receiving processing by the client 114 shown in FIG. 23 with reference to the block diagram shown in FIG. 23 and a flowchart shown in FIG. 24.

At steps S91 through S93, if a user operates the operation section 115 to start the streaming, the streaming-data-receiving processing starts, similar to the steps S31 through S33 shown in FIG. 15.

At step S94, if it is determined that the user has performed switching operation, the timestamp storage section 311 stores timestamp relative to the streaming data that is receives last from the server 111 through the network 113 among the streaming data stored in the buffer 255 at step S95.

In this moment, the sending portion 252a sends a request for switching operation to the server 111 through the network 113 under the control of the control section 251 based on the operation signal from the operation section 115. The server 111, which receives the request for switching operation, sends the streaming data after the operation. It is to be noted that, to this streaming data, any mark information is not added.

In other words, the client 114 receives the streaming data after operation, to which any mark information is not added, from the server 111 through the network 113 when the user has performed the switching operation.

Figure 25:
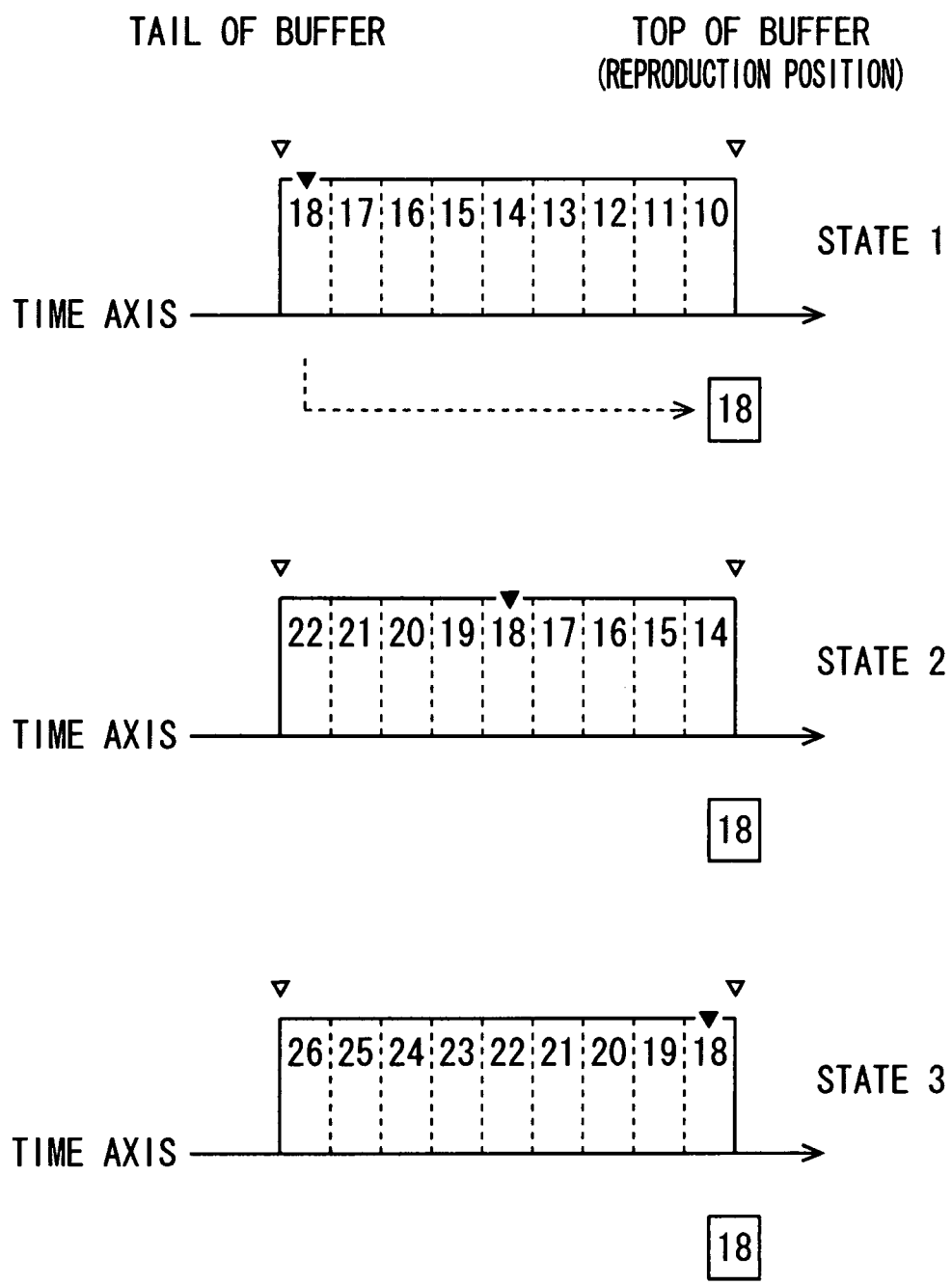
FIG. 25 is a diagram for illustrating items of streaming data stored in the buffer.

FIG. 25 illustrates items of the streaming data stored in the buffer 255.

Three states in the buffer 255 are illustrated in FIG. 25. Supposing that they are arranged as States 1, 2, and 3 from a top thereof to a bottom thereof in FIG. 25, the streaming data stored in the buffer 255 alters in an order of State 1, State 2, and State 3 as the time has been elapsed.

In State 1, the buffer 255 is partitioned by the dotted lines into nine squares 10 through 18, each indicating the streaming data stored in the buffer 255. Time elapses from left side to right side in FIG. 22. In other words, the buffer 255 is a memory of FIFO type such that the oldest stored streaming data is first read out thereof. Among nine squares, a leftmost square 18 indicates the steaming data stored in a tail of the buffer 255. The leftmost square 18 indicates the steaming data last stored in the buffer 255 and a rightmost square 10 indicates the streaming data first stored in the buffer 255. Thus, the rightmost square 10 of the nine squares indicates a top item of the streaming data stored in the buffer 255 so that the reproduction section 257 reproduces the top item of the streaming data.

Similarly, in State 2 of the buffer 255, the rightmost square 14 of the nine squares indicates a top item of the streaming data stored in the buffer 255. In State 3 of the buffer 255, the rightmost square 18 of the nine squares indicates a top item of the streaming data stored in the buffer 255.

As shown in State 1 shown in FIG. 25, the timestamp storage section 311 stores a timestamp relative to the streaming data in the square 18 that is received last from the server 111 through the network 113 among the streaming data stored in the buffer 255 and stored in a tail of the buffer 255. Specifically, the timestamp storage section 311 stores the timestamp relative to, for example, the RTP packet constituting the streaming data that is stored at a tail of the buffer 255 as shown in FIG. 14.

Accordingly, the reproduction-speed-controlling section 256 gets the streaming data after switching operation by means of, for example, comparing the timestamp of RTP packet stored in the timestamp storage section 311 with the timestamp of the RTP packet constituting the streaming data stored at a top of the buffer 255 and reproduced by the reproduction section 257.

Referring back to the flowchart shown in FIG. 24, at steps S96 through S98, the received streaming data is decoded with it being stored temporarily, similar to the steps S36 through S38 shown in FIG. 15.

At step S99, the reproduction-speed-controlling section 256 performs the reproduction-speed-control processing to control the reproduction speed so that the streaming data stored in the buffer 255 can be reproduced at a desired rate. The reproduction-speed-controlling section 256 supplies the reproduction section 257 with such the streaming data.

Figure 26:
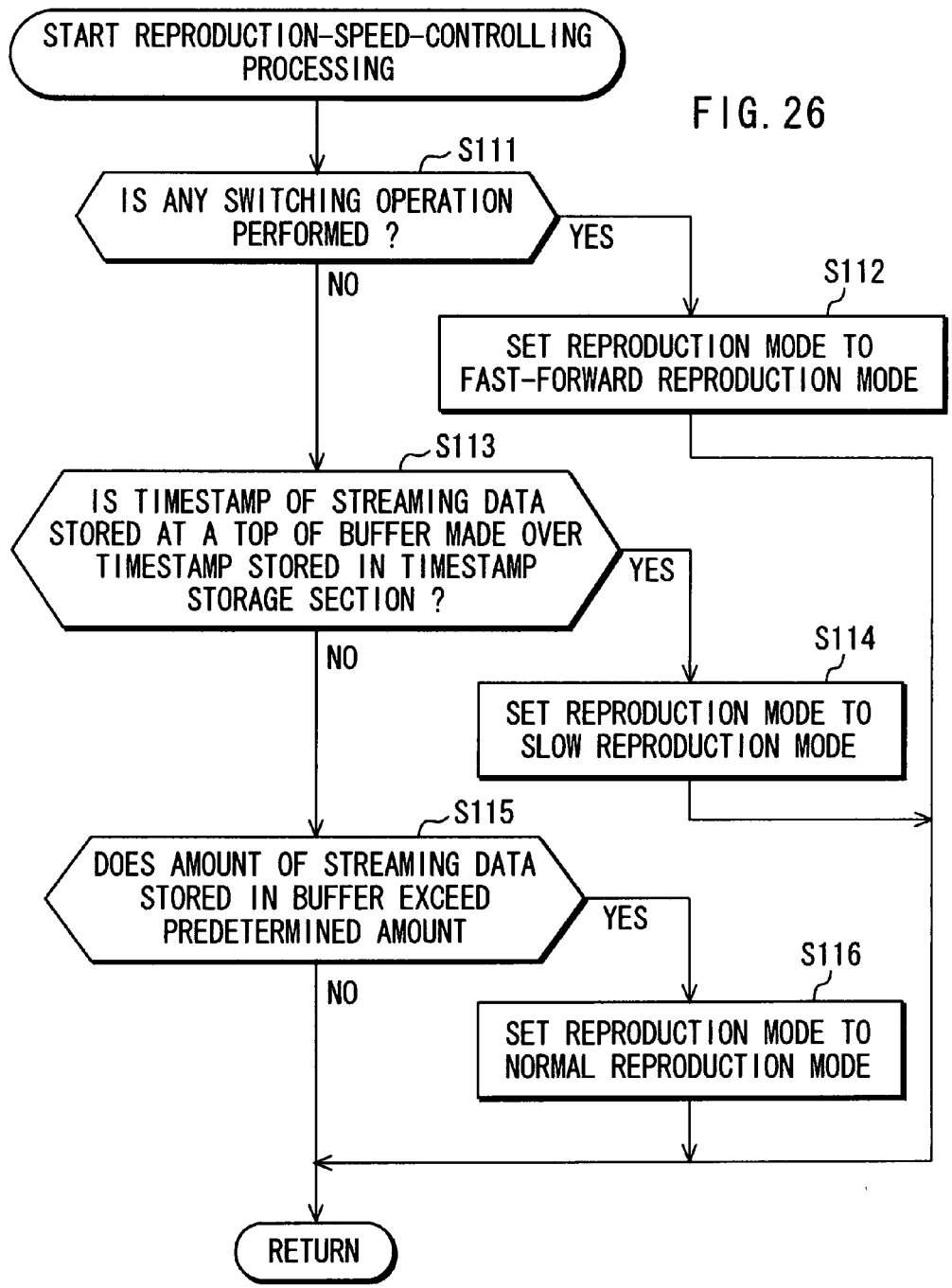
FIG. 26 is a flowchart for explaining reproduction-speed-controlling processing by a reproduction speed control section shown in FIG. 23.

Herein, the following will describe details of the reproduction-speed-controlling processing by the reproduction-speed-controlling section 256 shown in FIG. 23, which corresponds to the processing in the step S99, with reference to a flowchart shown in FIG. 26.

At steps S111 and S112, the reproduction-speed-controlling section 256 changes the reproduction mode to the fast-forward reproduction mode when a user performs any switching operation, similar to the steps S51 and S52 shown in FIG. 16.

At step S113, the reproduction-speed-controlling section 256 determines whether or not the timestamp of the streaming data stored at a top (reproduction position) of the buffer 255 is made over the timestamp stored in the timestamp storage section 311. In other words, the reproduction-speed-controlling section 256 keeps the reproduction mode to the fast-forward reproduction mode until the square 18 relative to the streaming data, the timestamp of which is stored in the timestamp storage section 311, has reached to the top of the buffer 255 as indicated in State 2 shown in FIG. 25.

In other words, the reproduction-speed-controlling section 256 changes the reproduction speed of the streaming data stored in the buffer 255 to a fast-forward reproduction when the user performs the switching operation. This allows the client 114 immediately can reproduce the streaming data that has been changed to the fast-forward reproduction after receiving such the streaming data from the server 111.

Referring back to the flowchart shown in FIG. 26, at steps S113 and S114, the reproduction-speed-controlling section 256 changes the reproduction mode to a slow reproduction mode, as State 3 shown in FIG. 25, when the square 18 relative to the streaming data has been reached at the top of the buffer 255. In other words, if the timestamp of the streaming data stored at a top (reproduction position) of the buffer 255 is made over the timestamp stored in the timestamp storage section 311, the streaming data after the timestamp of the streaming data stored at a top (reproduction position) of the buffer 255 is made over the timestamp stored in the timestamp storage section 311 is the streaming data after the user performs the switching operation so that all the streaming data to be fast-forwarded is reproduced. Thus, the reproduction-speed-controlling section 256 changes the reproduction mode from the fast-forward reproduction mode to the slow reproduction mode to increase an amount of the streaming data stored in the buffer 255.

Referring back to the flowchart shown in FIG. 26, at steps S115 and S116, the reproduction-speed-controlling section 256 changes the reproduction mode from the slow reproduction mode to a normal reproduction mode, if it is determined that the amount of the streaming data store in the buffer 255 exceeds a predetermined value, because the buffer 255 stores a sufficient amount of the streaming data. The reproduction-speed-controlling section 256 then reproduces the streaming data stored in the buffer 255 at a normal reproduction rate.

Referring back to the flowchart shown in FIG. 24, at steps S100 and S102, the streaming data received from the server 111 through the network 113 is reproduced and output until the streaming data has completed, similar to the steps S40 and S42 shown in FIG. 15.

Thus, since storing the timestamp by the client 114 removes cooperation with the server 111, the user can design the client 114 with any high independency. In other words, the client 114 can implement any functions by the embodiments of the invention regardless of any operations of the server 111.

It is to be noted that when the client 114 stores the timestamp, there occurs difference in terms of time between a point of time when the user performs any switching operation and a stored timestamp similar to a case where the mark information is added. Accordingly, if a small delay occurs in the network 113 and the streaming data generated in the server 111 is favorably sent to the client 114 through the network 113, it is possible to obtain an excellent effect identical to that in a case where the server 111 adds the mark information to the streaming data.

Although the above-mentioned embodiment in which, as the flowcharts shown in FIGS. 16 and 26, when it is determined that the user performs any switching operation, the reproduction-speed-controlling section 256 has changed the reproduction mode to the fast-forward reproduction mode (see the step S52 shown in FIG. 16 and the step S112 shown in FIG. 26), instead of this, it may be determined whether or not the RTP packet to which the mark information is added has been received and if it is determined that the RTP packet to which the mark information is added has been received, the reproduction mode may be changed to the fast-forward reproduction mode. The following will describe operations of the client 114 that changes the reproduction mode to the fast-forward reproduction mode if the RTP packet to which the mark information is added has been received, with reference to FIG. 27.

It is to be noted that a configuration of this client 114 is similar to that shown in FIG. 11 as well as the operations of this client 114 is also similar to those indicated by the flowchart shown in the above-mentioned FIG. 15, detailed description of which will be suitably omitted.

Figure 27:
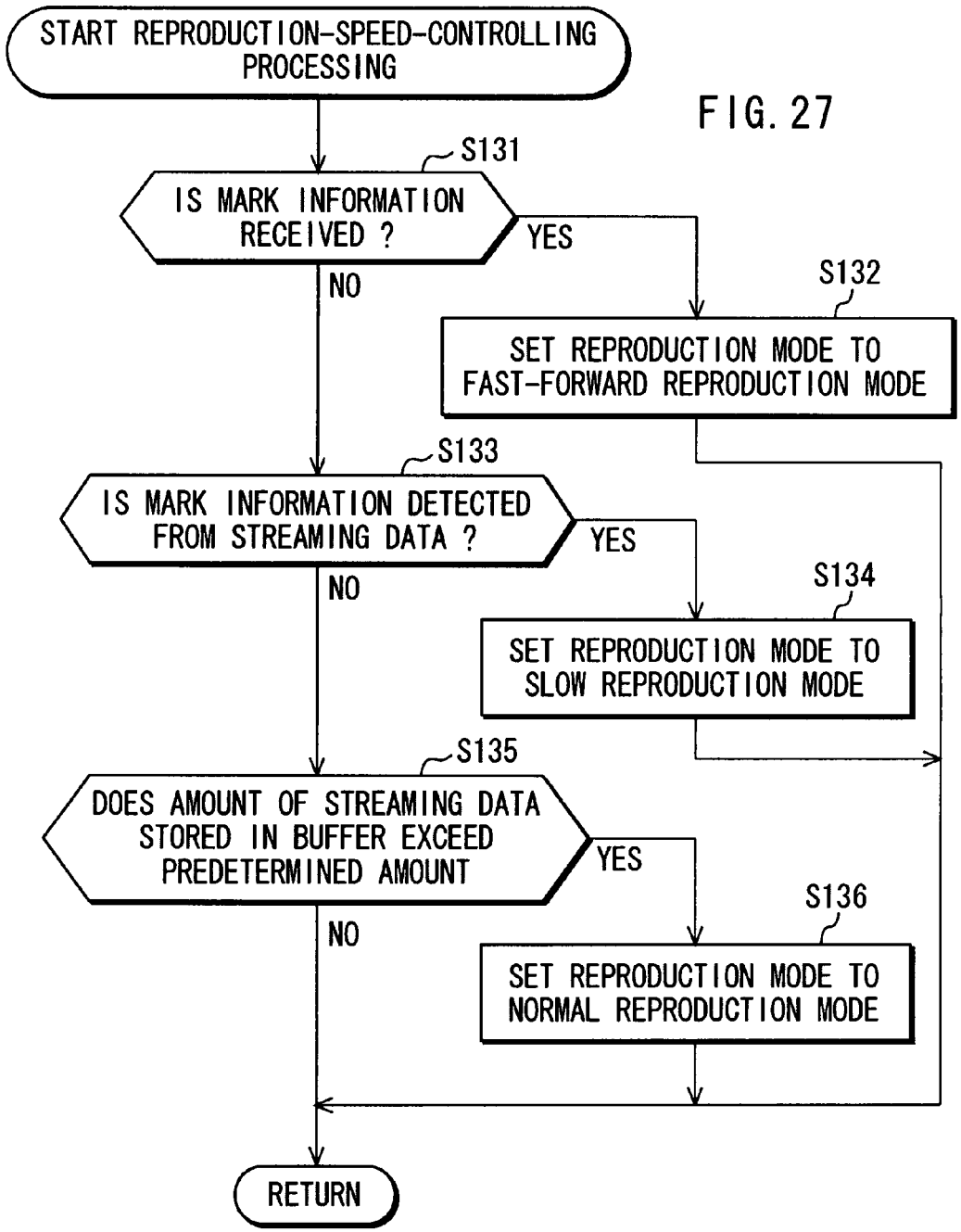
FIG. 27 is a flowchart for explaining reproduction-speed-controlling processing by a reproduction-speed-controlling section shown in FIG. 11.

In other words, FIG. 27 shows a flowchart for explaining detail of other example of the reproduction-speed-controlling processing by the reproduction-speed-controlling section 256 shown in FIG. 11, which corresponds to the step S39 shown in FIG. 15.

At step S131, the reproduction-speed-controlling section 256 determines whether the streaming data to which the mark information is added is received from the server 111 through the network 113.

If it is determined at the step S131 that the streaming data to which the mark information is added is received, at step S132, the reproduction-speed-controlling section 256 sets the reproduction mode to the fast-forward reproduction mode. The reproduction-speed-controlling section 256 keeps the reproduction mode to the fast-forward reproduction mode until it is determined at step S133 that the mark information has been detected from the streaming data stored in a top position (a reproduction position) of the buffer 255.

When it is then determined at the step S133 that the mark information has been detected from the streaming data stored in a top position (a reproduction position) of the buffer 255, the reproduction-speed-controlling section 256 changes the reproduction mode to a slow reproduction mode at step S134.

The reproduction-speed-controlling section 256 then keeps the reproduction mode to the slow reproduction mode until it is determined at step 135 that the streaming data stored in the buffer 255 exceeds a predetermined value, and at step S136, the reproduction-speed-controlling section 256 then changes the reproduction mode to the normal reproduction mode when it is determined at the step 135 that the streaming data stored in the buffer 255 exceeds the predetermined value, which are similar to the steps S55 and S56 shown in FIG. 16.

The processing then returns to the step S39 and the following processing then is carried out.

In other words, the reproduction-speed-controlling section 256 determined whether or not the client 114 receives the mark information from the server 111. If it is determined that the mark information is received, the reproduction-speed-controlling section 256 sets the reproduction mode to the fast-forward reproduction mode, by which the fast-forward reproduction starts and the streaming data is fast-forward reproduced for a period of predetermined time up to the position where a part of the streaming data to which the mark information is added is reproduced. When the streaming data has been reproduced up to the part of the streaming data to which the mark information is added, the reproduction-speed-controlling section 256 sets the reproduction mode to the slow reproduction mode.

Thus, the fast-forward reproduction is performed for a period of predetermined time so that new streaming data can be stored in the buffer 255 for period of predetermined time. Even if the network 113 has lack of stability, this allows the streaming data to be successively reproduced. It is to be noted that the above-mentioned period of predetermined time refers to one second or less, preferably 300 ms through 600 ms, particularly about 400 ms. If this period of predetermined time is set too long, this causes mal-handling while if it is set too short, this may cause any rupture in the reproduction when the network 113 has lack of stability.

Instead of the step 133 in the flowchart shown in FIG. 27, it may be determined whether or nor a period of predetermined time elapses after the mark information has been received and if it is determined that the period of predetermined time elapses, the processing may go to the step S133. In this case, when a period of predetermined time elapses after the mark information has been received, the reproduction mode is automatically changed from the fast-forward reproduction mode to the slow reproduction mode.

Thus when, the server 111 connected to the sources of image and audio 112 sends the streaming data to each of the clients 114, each of the clients 114 has a buffer so that the streaming data can be stably reproduced and the streaming data in response to any operation by a user relative to the sources of image and audio 112 can be also reproduced with a very small delay. This enables a response in response to a set operation by a user relative to the sources of image and audio 112 to be improved, thereby upgrading its usability.

Since shortening the delay accompanying user's operation is realized by performing the fast-forward reproduction on the streaming data stored in the buffer, the user can view image and hear audio successively without any rupture in terms of time between the streaming data before the user's operation and the streaming data after the user's operation. This allows the user to grasp a before and after relationship of the contents correctly when he or she performs a trick play, thereby enabling any usability such as the fast-forward and reverse of the sources of image and audio 112 to be improved.

Although, in the above embodiments, the reproduction-speed-controlling section 256 has controlled the reproduction rate of the streaming data stored in the buffer 255, the reproduction-speed-controlling section 256 may control the reproduction rate of the streaming data stored in the buffer 253 that is principally used for sending and/or receiving, similar to the control of the reproduction rate of the streaming data stored in the buffer 255.

Although each of the clients 114 has been provided with two buffers 253, 255, this invention is not limited thereto. One or three or more buffers may be used in each of the clients 114. Even when each of the clients 114 has one or three or more buffers, the reproduction-speed-controlling section 256 may control the reproduction rate of the streaming data stored in each of these buffers, similar to the control of the reproduction rate of the streaming data stored in the buffer 255.

A series of the above-mentioned processing can be realized by hardware or software. If the series of the processing is realized by software, programs constituting the software are installed by using any recording media to a computer built in a special-purpose hardware, or, for example, a general-purpose personal computer that can carry out various kinds of functions by installing various kinds of programs therein.

The recording media contains the removable media 161 shown in FIG. 9 such as a magnetic disk (including flexible disk), an optical disk (including compact disk-read only memory (CD-ROM), DVD), magneto-optical disk (Mini-Disk (trademark)), or a semiconductor memory, which record the programs and may be sent in order to provide the users with the programs apart from installation into the computer, and may contain ROM 152 or the storage section 158 shown in FIG. 9 that record the programs and may be sent to each of the users with them being previously installed with in a computer.

The programs used for realizing the series of the above processing may be installed into a computer through any interface such as a router or a modem, or through any wired or wireless communication media such as a local area network, the Internet, or digital satellite broadcasting.

It is to be noted that, in this specification, the steps described in the programs to be stored in the recording media are not only processed following a time series along a described order, but also be able to be carried out in parallel or separately.

It is also to be noted that, in this specification, the system is referred to as entire equipment that is constituted of plural apparatuses.

It should be understood by those skilled in the art that various modifications, combinations, sub-combinations and alternations may occur depending on design requirements and other factors insofar as they are within the scope of the appended claims or the equivalents thereof.

The invention claimed is:

1. A data transmission system comprising:
a sending apparatus that sends streaming data; and
a receiving apparatus that receives the streaming data from the sending apparatus and sends a request for a switching operation of the streaming data to the sending apparatus, the switching operation being selectable from a group including changing a channel, switching to another sending apparatus as a source of streaming data, and switching to a trick play of the sending apparatus, wherein the sending apparatus switches the streaming data in response to the request, said request being received from the receiving apparatus,
wherein the receiving apparatus includes a processing device to execute:
a receiving section that receives the streaming data from the sending apparatus;
a storage section that stores the received streaming data temporarily and then, transfers the received streaming data;
an operation-detecting section that detects whether a user has performed the request for the switching operation; and
a control section that controls a transfer rate of the streaming data stored in the storage section and controls a reproduction speed of the streaming data stored in the storage section to perform a fast-forward reproduction of the streaming data stored in the storage section when the operation-detecting section detects that the user has performed the request for the switching operation; and
an information-adding section that, when the operation-detecting section detects that the user performs the request, adds to a portion within a packet constituting a streaming data item last received, among packets constituting streaming data items as the received streaming data stored in the storage section, additional information that the user has performed the request for the switching operation.

2. A receiving apparatus that receives streaming data and sends a request for a switching operation of the streaming data, the receiving apparatus comprising:
a processing device to execute:
a receiving section that receives the streaming data;
a storage section that stores the received streaming data temporarily and then, transfers the received streaming data;
an operation-detecting section that detects whether a user has performed the request for a switching operation, the switching operation being selectable from a group including changing a channel, switching to another sending apparatus as a source of streaming data, and switching to a trick play of the sending apparatus;
a control section that controls a transfer rate of the streaming data stored in the storage section and controls a reproduction speed of the streaming data stored in the storage section to perform a fast-forward reproduction of the streaming data stored in the storage section when the operation-detecting section detects that the user has performed the request for the switching operation of the streaming data; and
an information-adding section that, when the operation-detecting section detects that the user performs the request, adds to a portion within a packet constituting a streaming data item last received, among packets constituting streaming data items as the received streaming data stored in the storage section, additional information that the user has performed the request for the switching operation.

3. The receiving apparatus according to claim 2, wherein the control section controls the reproduction speed of the streaming data stored in the storage section to perform a slow reproduction of the streaming data stored in the storage section until an amount of streaming data stored in the storage section become a predetermined amount when the additional information is detected.

4. The receiving apparatus according to claim 2, wherein the control section controls the reproduction speed of the streaming data stored in the storage section to perform the fast-forward reproduction of the streaming data stored in the storage section until the additional information added to the streaming data stored in the storage section is detected.

5. The receiving apparatus according to claim 4, wherein the control section controls the reproduction speed of the streaming data stored in the storage section to perform a slow reproduction of the streaming data stored in the storage section until the streaming data stored in the storage section is reached to a predetermined amount when the additional information is detected.

6. The receiving apparatus according to claim 2, further comprising a time storage section that stores a point of time added to the streaming data item last received when the operation-detecting section detects that the user performs the request, wherein the control section controls the reproduction speed of the streaming data stored in the storage section to perform the fast-forward reproduction of the streaming data stored in the storage section until the point of time added to the reproduced streaming data elapses over the stored point of time.

7. The receiving apparatus according to claim 6, wherein the control section controls the reproduction speed of the streaming data stored in the storage section to perform a slow reproduction of the streaming data stored in the storage section until the streaming data stored in the storage section is reached to a predetermined amount when the additional information is detected.

8. The receiving apparatus according to claim 2, further comprising an operation section operated by the user for providing an instructing switch of external equipment that supplies the streaming data, switch of channel, or reproduction, reverse, fast-forward, pause or stop of external device.

9. The data transmission system of claim 2, wherein the additional information indicates a sequence number.

10. A receiving method of a receiving apparatus that receives streaming data and transmits a request for a switching operation of the streaming data, the receiving method comprising:
- receiving the streaming data by a receiving section of the receiving apparatus;
- storing the received streaming data temporarily in a storage section of the receiving apparatus and then, transferring the received streaming data;
- detecting by an operation-detecting section of the receiving apparatus whether a user performs the request for the switching operation of the streaming data, the switching operation being selectable from a group including changing a channel, switching to another sending apparatus as a source of streaming data, and switching to a trick play of the sending apparatus;
- controlling a reproduction speed of the streaming data stored in the storage section to perform a fast-forward reproduction of the streaming data stored in the storage section when the operation-detecting section detects that the user performs the request for the switching operation of the streaming data; and
- when the operation-detecting section detects that the user performs the request, adding to a portion within a packet constituting a streaming data item last received, among packets constituting streaming data items as the received streaming data stored in the storage section, additional information that the user has performed the request for the switching operation.

11. A non-transitory computer readable medium having recorded thereon a program that allows a computer to perform a receiving method of a receiving apparatus that receives streaming data and transmits a request for a switching operation of the streaming data, the receiving method comprising:
- receiving the streaming data by a receiving section of the receiving apparatus;
- storing the received streaming data temporarily in a storage section of the receiving apparatus and then, transferring the received streaming data;
- detecting by an operation-detecting section of the receiving apparatus whether a user performs the request for the switching operation of the streaming data, the switching operation being selectable from a group including changing a channel, switching to another sending apparatus as a source of streaming data, and switching to a trick play of the sending apparatus;
- controlling a reproduction speed of the streaming data stored in the storage section to perform a fast-forward reproduction of the streaming data stored in the storage section when the operation-detecting section detects that the user performs the request for the switching operation of the streaming data; and
- when the operation-detecting section detects that the user performs the request, adding to a portion within a packet constituting a streaming data item last received, among packets constituting streaming data items as the received streaming data stored in the storage section, additional information that the user has performed the request for the switching operation.

* * * * *